(12) United States Patent
Simpson et al.

(10) Patent No.: US 6,301,853 B1
(45) Date of Patent: *Oct. 16, 2001

(54) STANDING SEAM ROOF ASSEMBLY

(75) Inventors: Harold G. Simpson, Tulsa; C. Stephen Salisbury, Moore, both of OK (US)

(73) Assignee: Harold Simpson, Inc., Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/059,146

(22) Filed: Apr. 13, 1998

Related U.S. Application Data

(63) Continuation-in-part of application No. 08/484,975, filed on Jun. 7, 1995, now Pat. No. 5,737,894, and a continuation-in-part of application No. 08/480,968, filed on Jun. 7, 1995, now Pat. No. 5,692,352.

(51) Int. Cl.$^7$ .................................................... E04D 3/367
(52) U.S. Cl. .................... 52/520; 52/528; 52/545; 52/550; 52/573.1
(58) Field of Search ............................. 52/520, 528, 545, 52/550, 573.1

(56) References Cited

U.S. PATENT DOCUMENTS

| | | | |
|---|---|---|---|
| 4,213,282 | * | 7/1980 | Heckelsberg ................... 52/528 X |
| 4,269,012 | * | 5/1981 | Mattingly et al. ................ 52/520 X |
| 4,522,005 | * | 6/1985 | Seaburg et al. .................. 52/520 X |
| 5,038,543 | * | 8/1991 | Neyer ................................. 52/528 |
| 5,201,158 | * | 4/1993 | Bayley et al. ....................... 52/537 |
| 5,379,517 | * | 1/1995 | Skelton ............................. 52/545 X |
| 5,737,894 | * | 4/1998 | Simpson et al. ..................... 52/520 |

* cited by examiner

Primary Examiner—Christopher T. Kent
(74) Attorney, Agent, or Firm—Crowe & Dunlevy

(57) ABSTRACT

A standing seam roof assembly having adjacent roof panels supported by underlying support structure in overlapping edge relationship to form a standing seam between adjacent roof panels, a first roof panel having a female sidelap portion forming male insertion cavities and a second roof panel having a male sidelap portion inserted into the male insertion cavities to form the standing seam assembly. The male sidelap portion has a tang member that lockingly engages a retaining groove of the female sidelap portion. The standing seam assembly prevents unfurling of the first and second roof panels by forming multiple force couples that resist forces due to uplift of the first and second panels. Mastic is placed between portions of the female and male sidelap portions to form a weathertight seal.

19 Claims, 20 Drawing Sheets

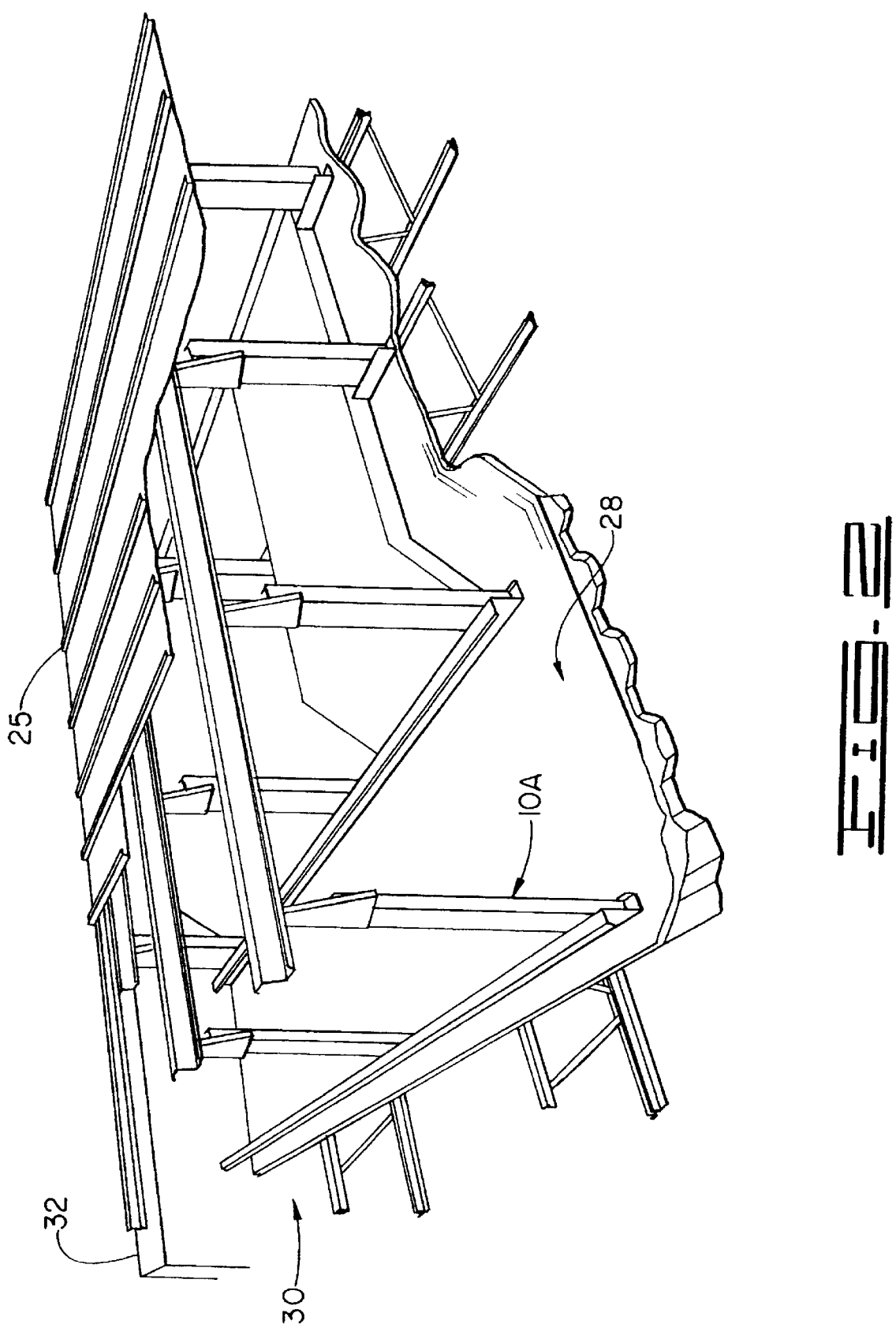

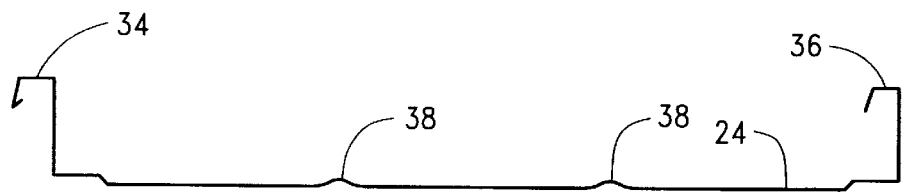
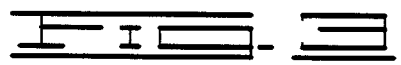
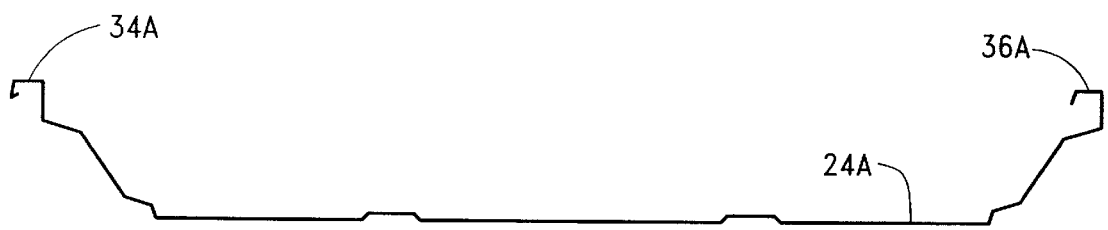
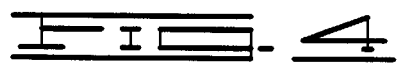
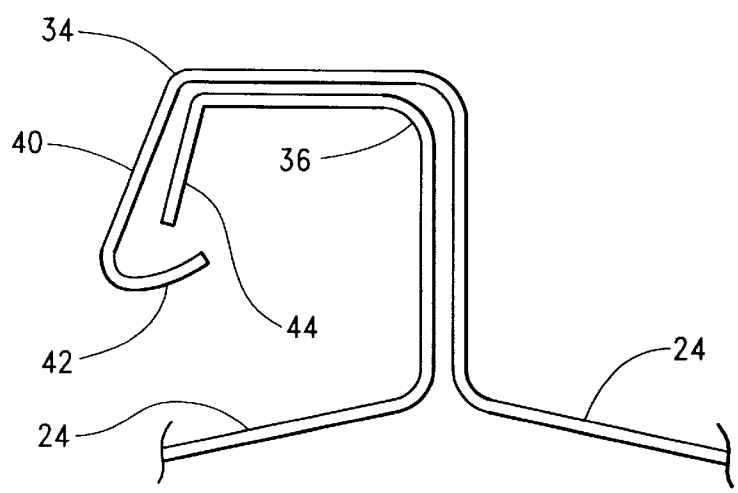
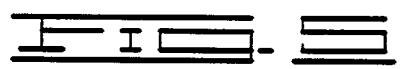

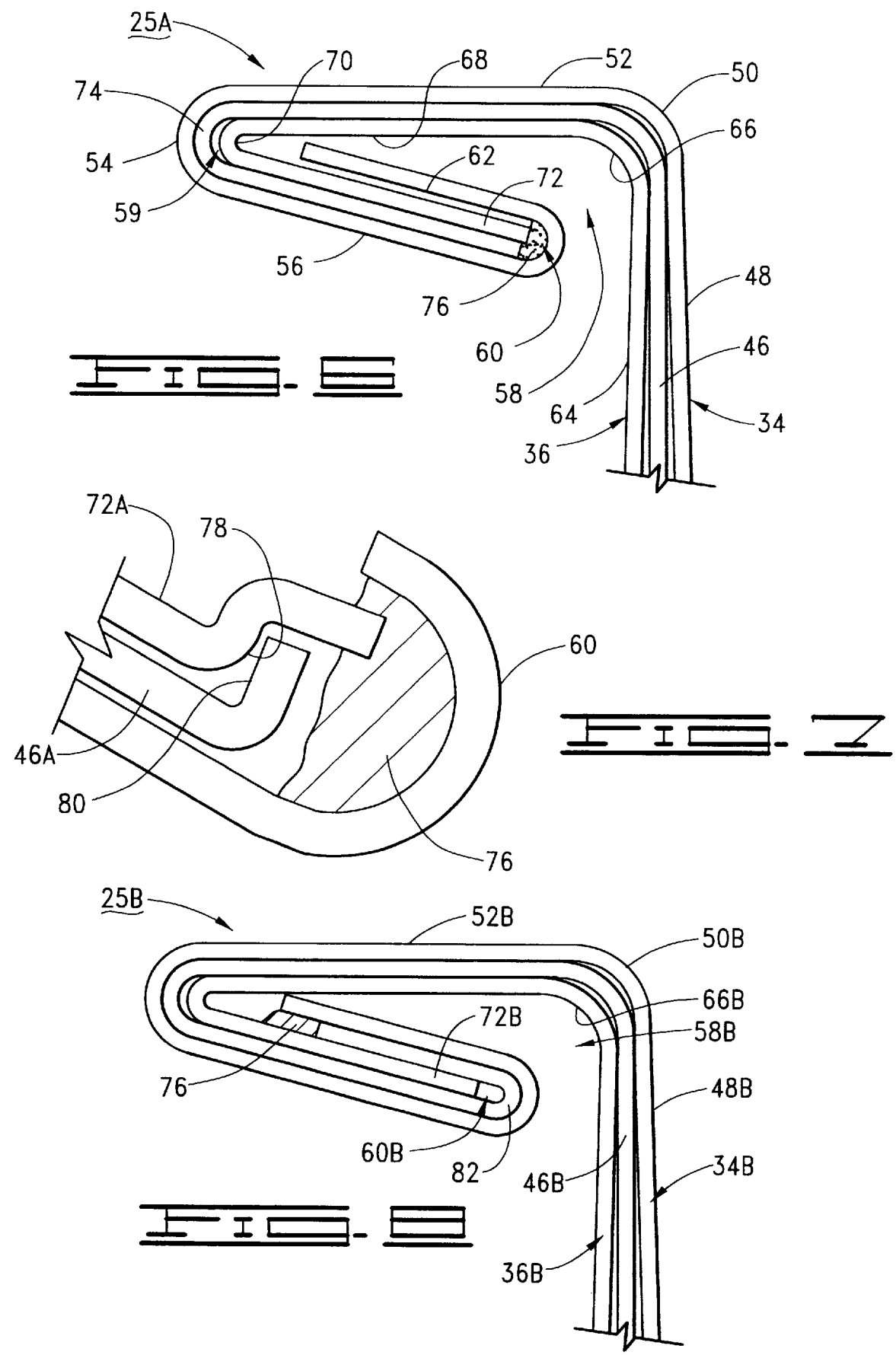

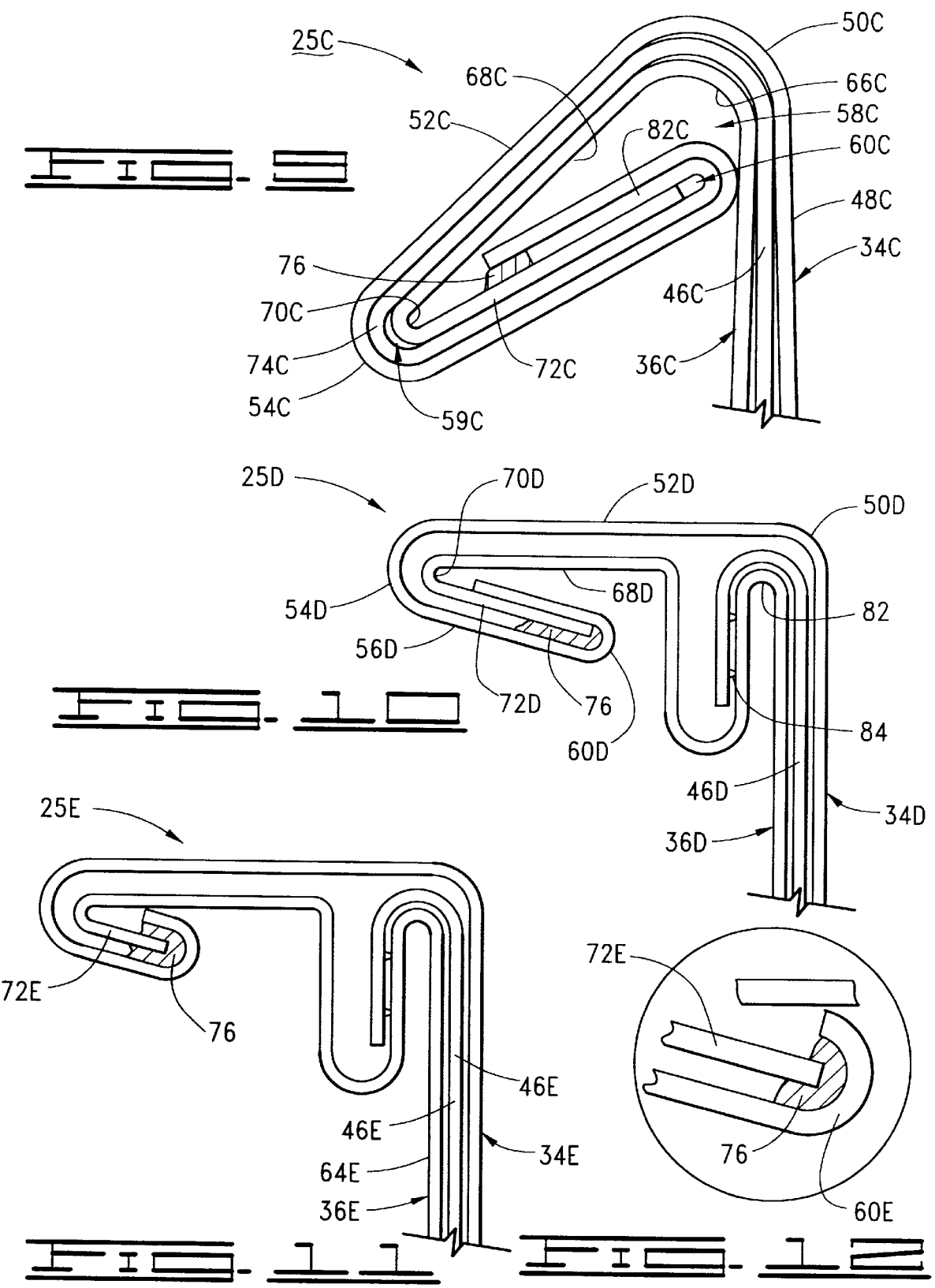

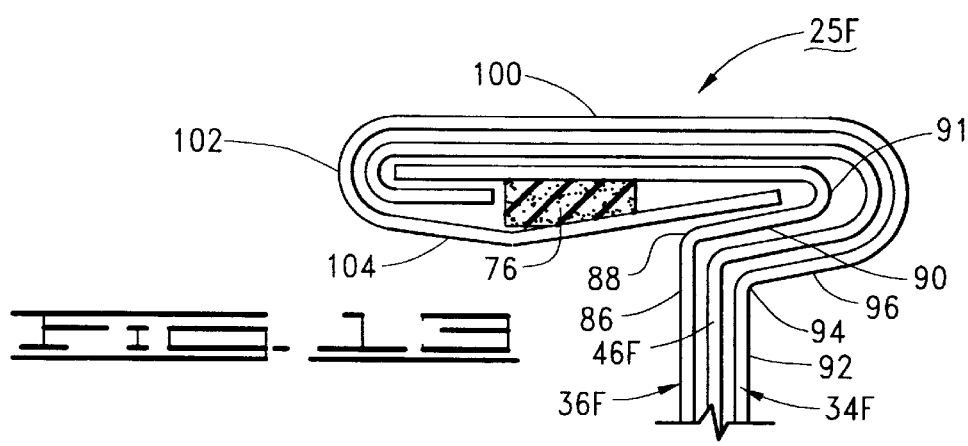
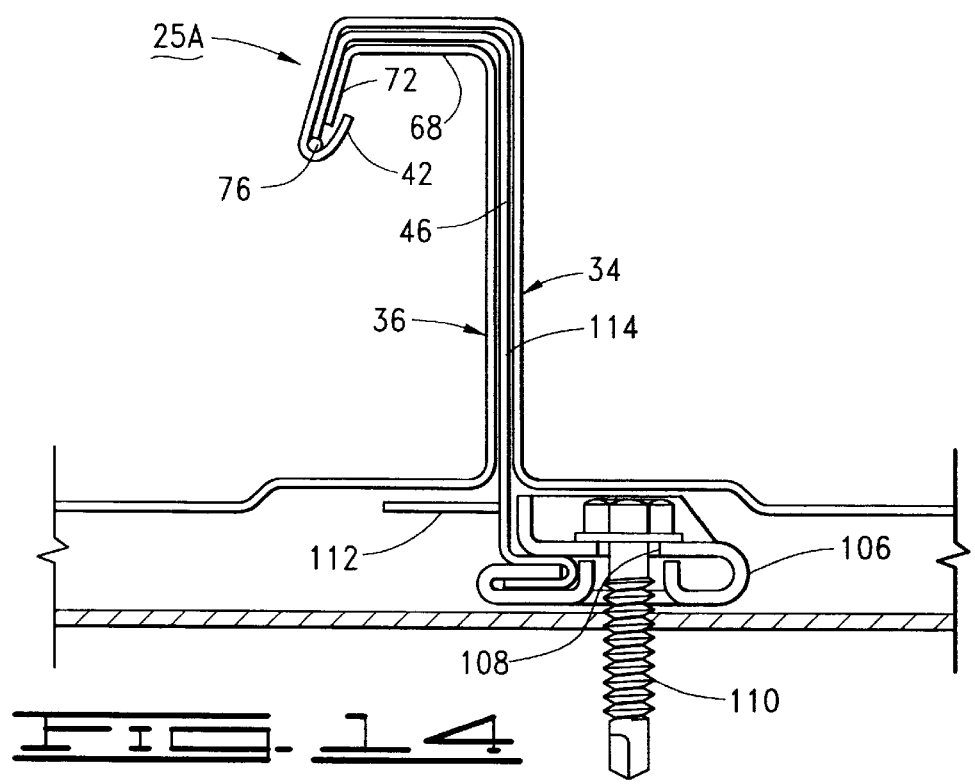
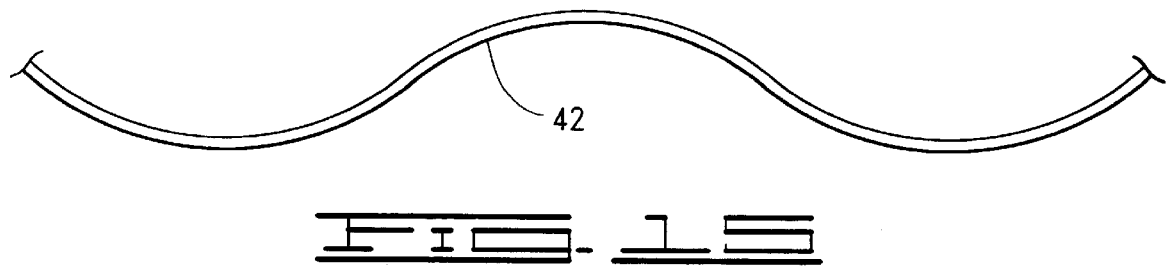

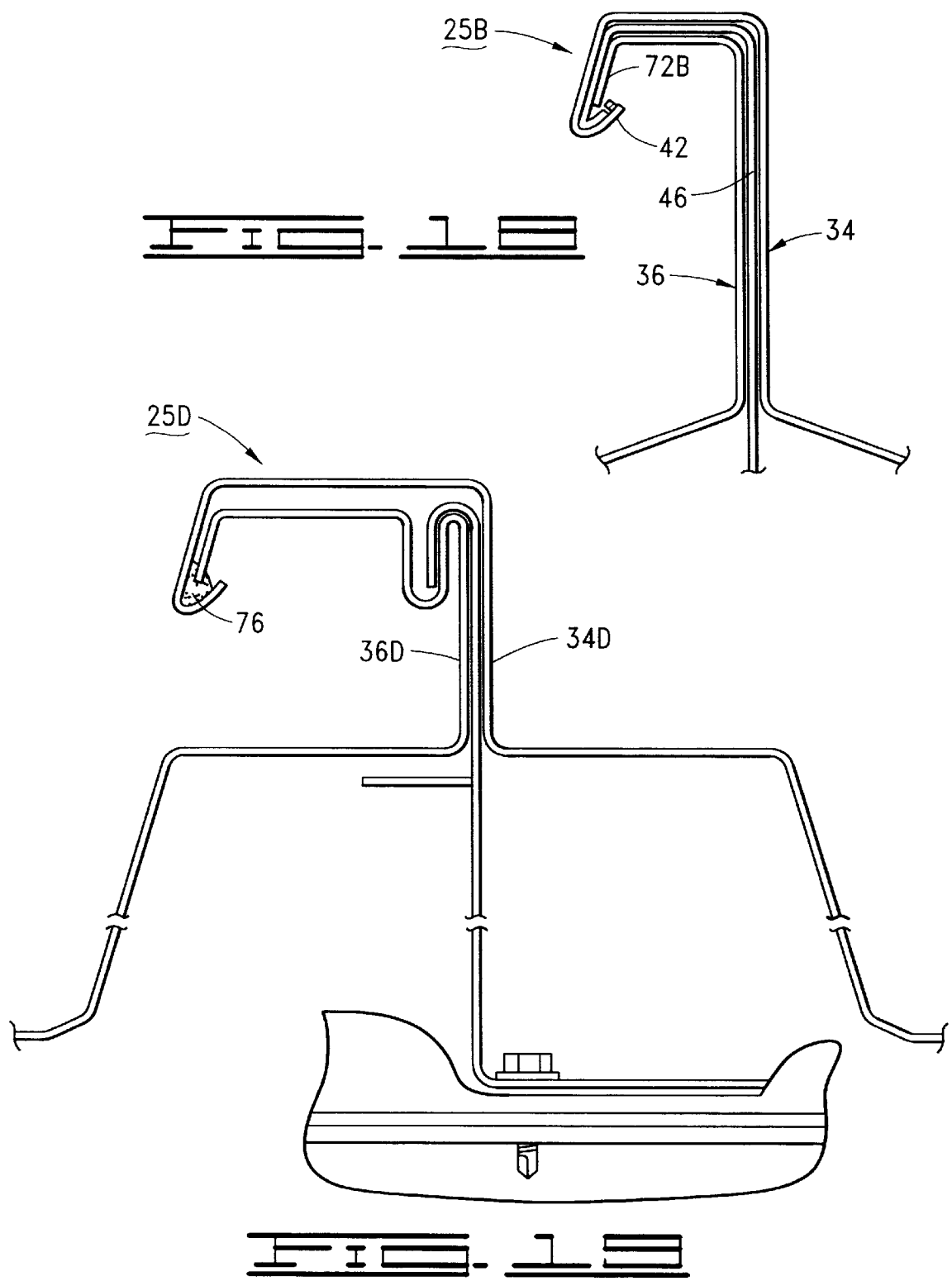

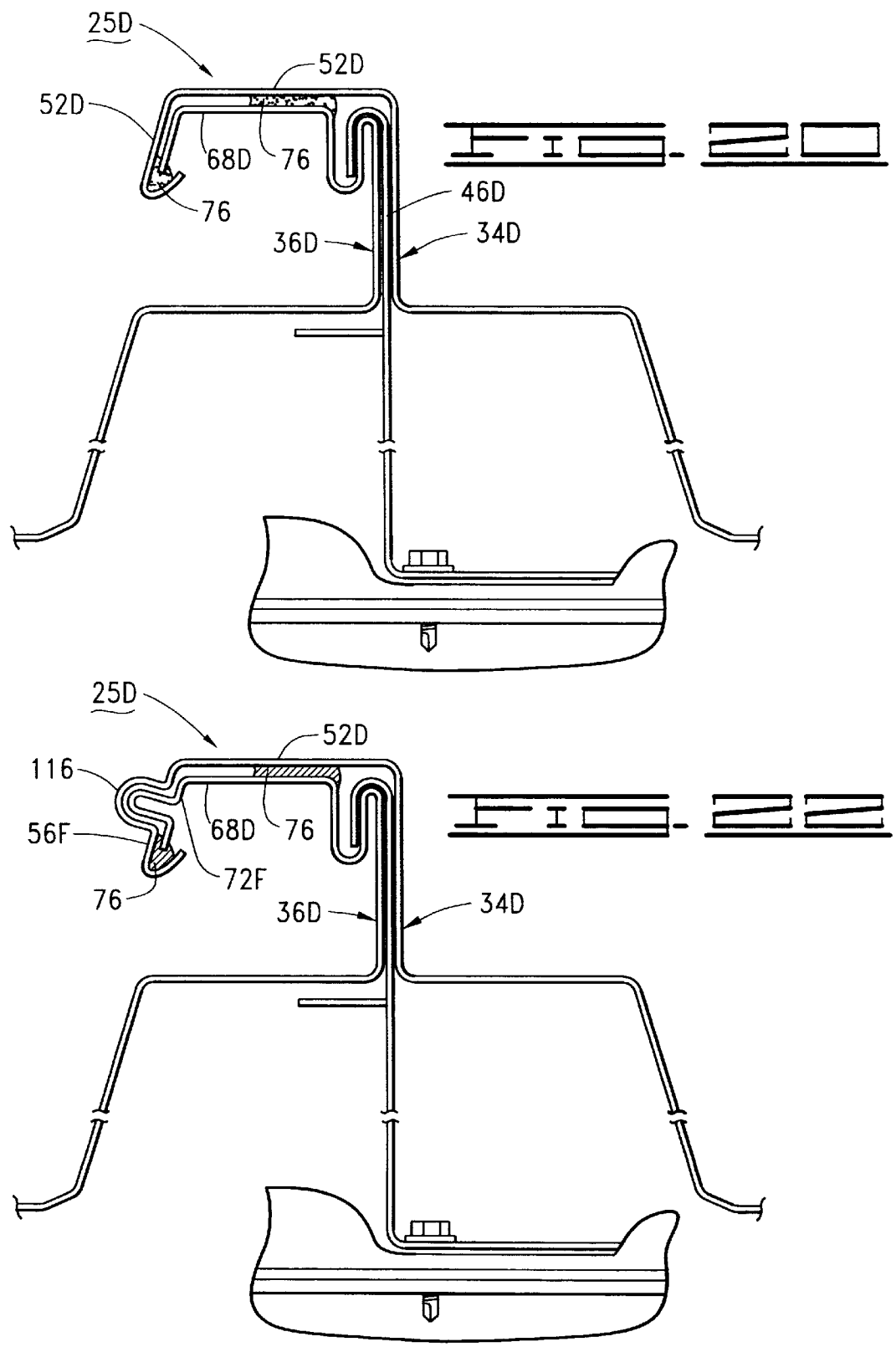

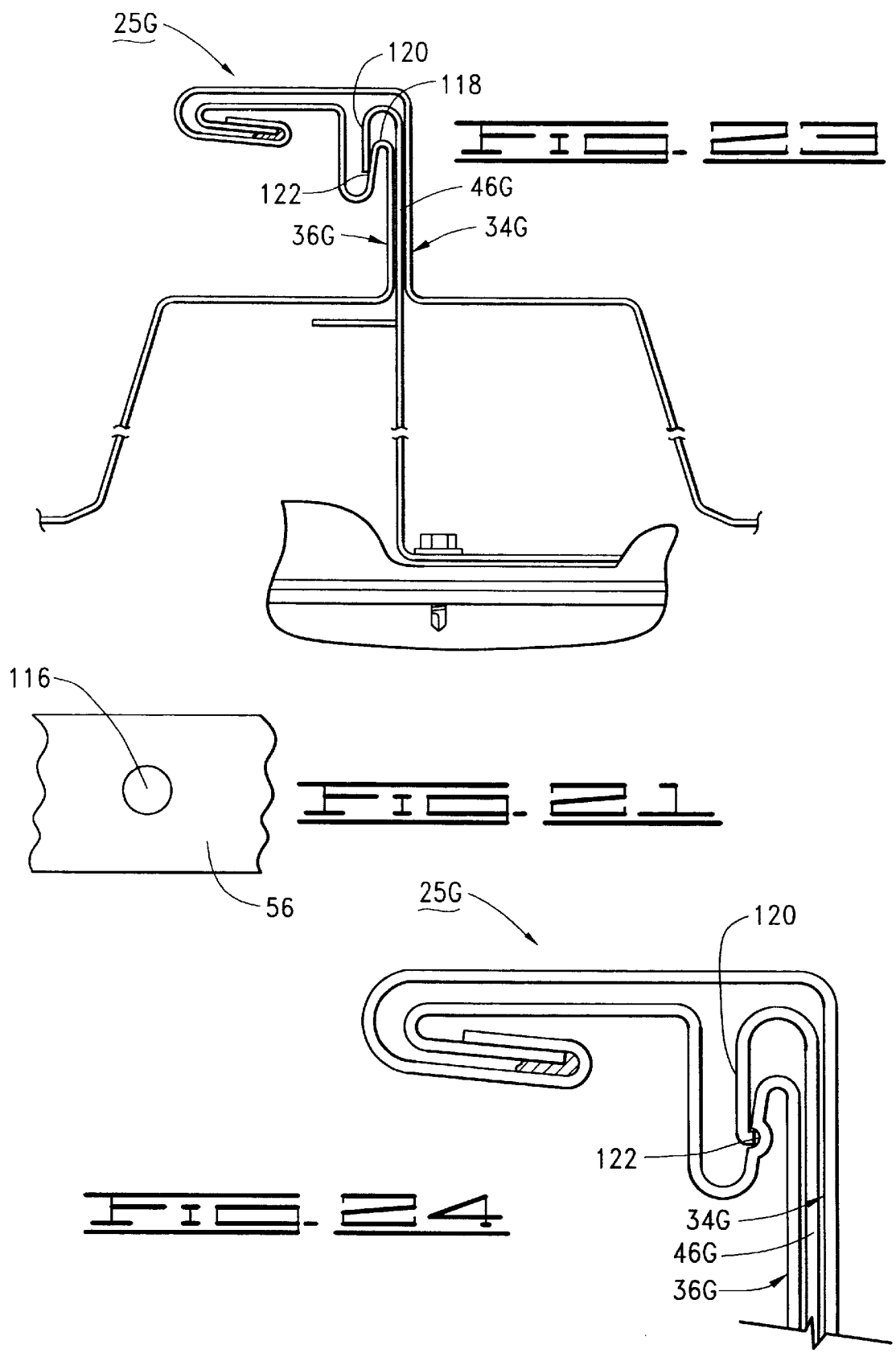

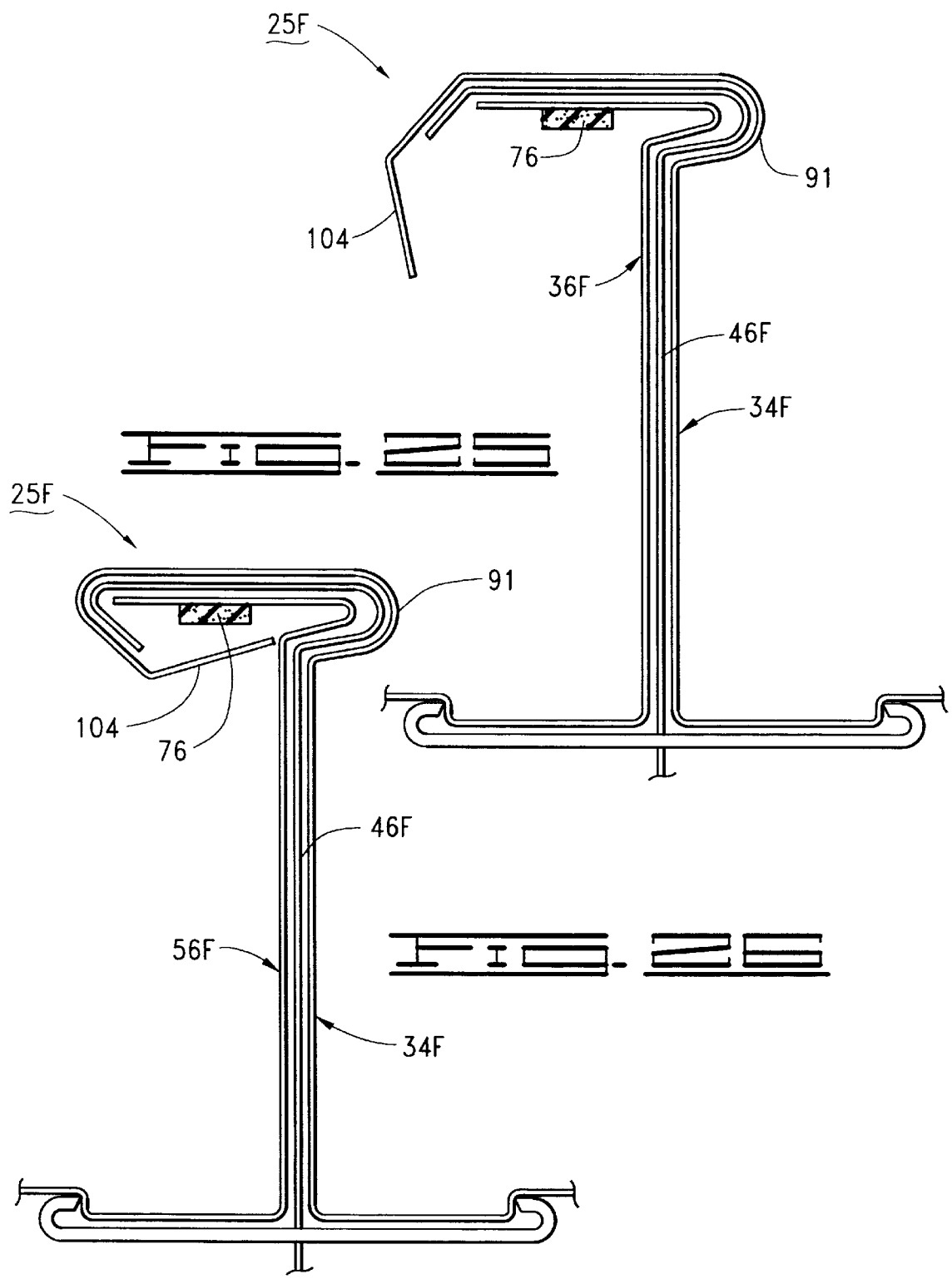

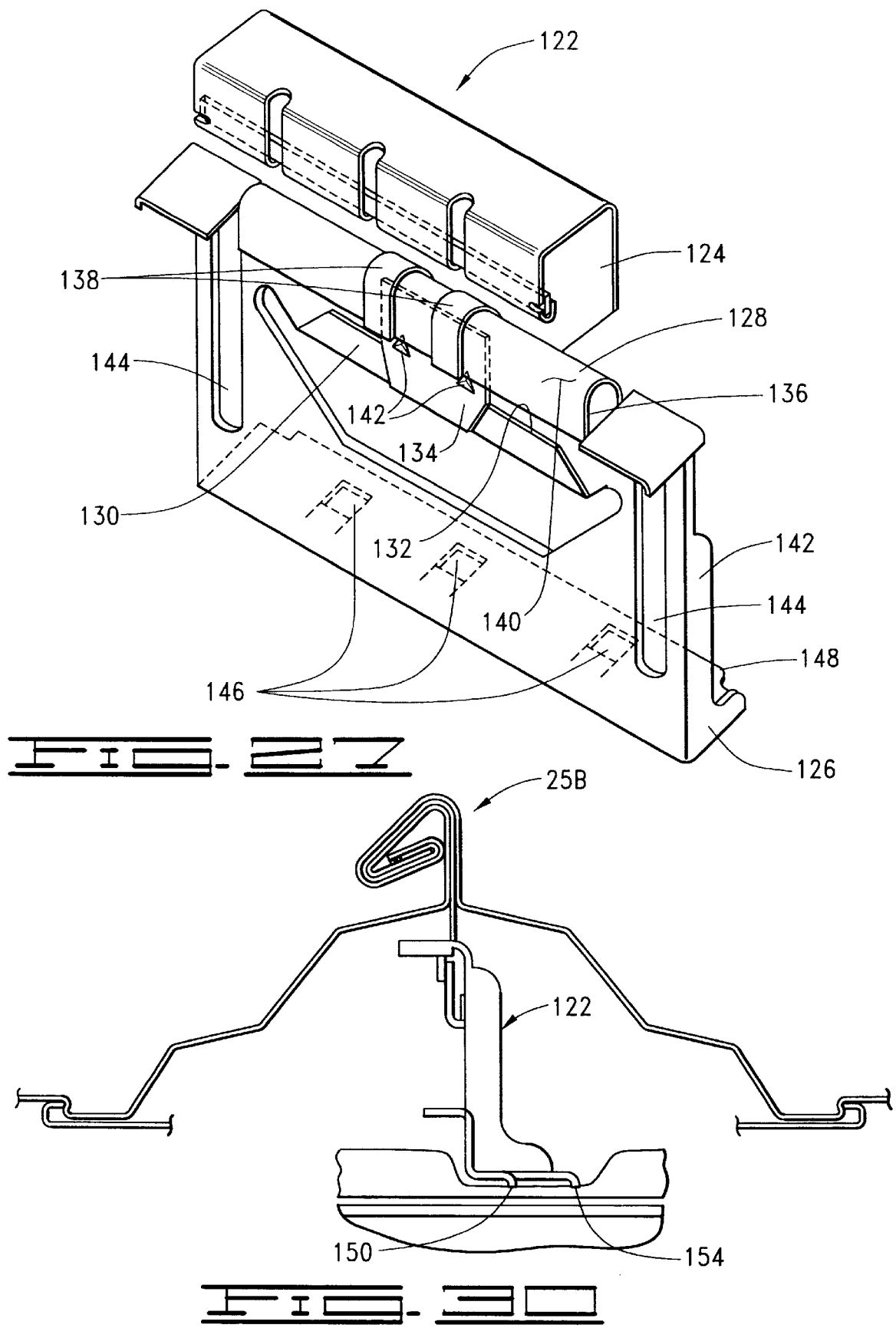

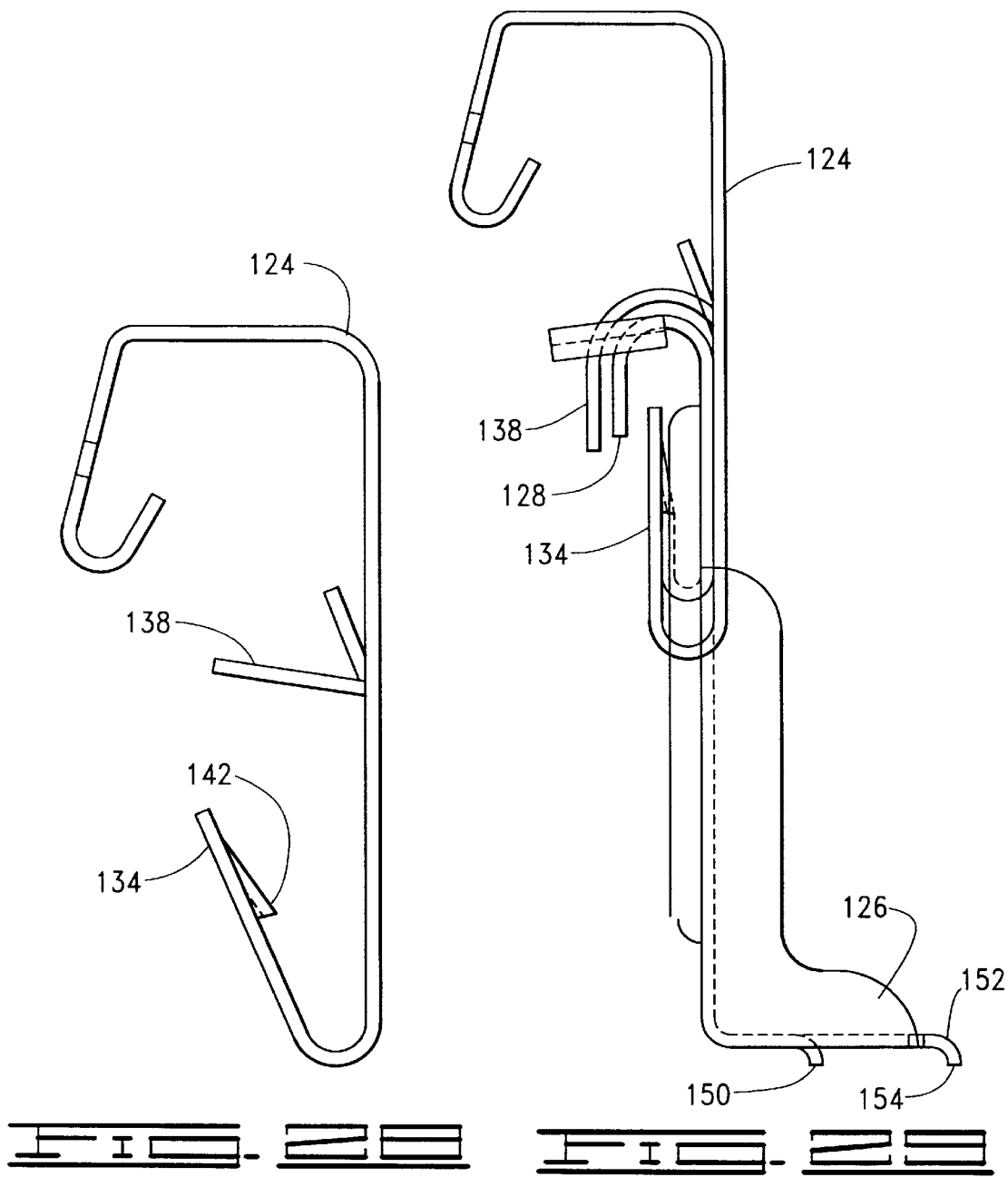

STANDING SEAM ROOF ASSEMBLY

RELATED APPLICATIONS

This application is a continuation-in-part of U.S. patent application Ser. No. 08/484,975 filed Jun. 7, 1995, issued Apr. 14, 1998 as U.S. Pat. No. 5,737,894; and of U.S. patent application Ser. No. 08/480,968 filed Jun. 7, 1995 and now U.S. Pat. No. 5,692,352 issued Dec. 2, 1997, which are herein incorporated by reference. This application is related to U.S. patent application Ser. No. 486,950 filed Jun. 7, 1995, also herein incorporated by reference.

FIELD OF THE INVENTION

The present invention relates to a roof assembly for a building structure, and more particularly, but not by way of limitation, to standing seam roof systems.

BACKGROUND

Numerous types of roof assemblies have previously been proposed for pre-engineered buildings in efforts to provide a watertight roof assembly, while at the same time enabling the roof assembly to expand and contract as changes in temperature are encountered. Typical of such prior art roof assemblies of considerable success in recent years is the standing seam roof assembly. The panel members of the standing seam roof assembly are joined along lapped together side edges forming the standing seams. The panel members of the standing seam roof are secured to the secondary structural members by either clips or through fasteners. Clips can be of two types: floating (one or two piece moveable); or fixed (one piece with no movement allowed between the panel and its supporting structure). Through fasteners attach the panels to underlying support structure and substantially fix or lock the panels and support structure together so that no differential movement can occur.

Roofs may be classified as shed roofs and low slope gasket roofs. Shed roofs are roofs that shed water because gravity pulls the water down and away from panel joints more effectively than wind or capillary action propel water thought the joint. Shed roofs generally occur over slopes of three to twelve or greater. Low slope gasket roofs, on the other hand, provide roof joints that are made watertight by placing a gasket material between the panel joints and securing the gasket in place by, for example, encapsulating the gasket material or exerting pressure upon it. Generally, low slope gasket roofs are usually ¼ to twelve slope or greater.

Heretofore, field seamed gasket joints used on large roofs have generally been limited to using two-piece clips wherein movement between the roof and its underlying structure took place within the clip. The reason for this is that in the past the line of sealant serving as a gasket and the top hook portion of the clip intersected and if the clip hook moved in relation to the panel which held the sealant, the relative movement deformed and destroyed the gasket seal. One-piece clips have been used freely in small and shed roofs where a gasket seal was not required.

Standing seam metal roofs exhibit considerable diaphragm strength and it is desirable to use this strength by interconnecting the roof to its support frame to help stabilize the support frame, rather than to brace and stabilize the support frame by other means.

Past practices have been to stabilize the support frame by means of separate bracing and on gasket roofs to use a suitable two-piece floating (moveable) clip to allow the brace and frame to remain fixed and for the panel to move in relation to the frame as it is subjected to temperature change or other forces, or to limit the length of the panel run to about 40 feet so that the movement of the panel as it expands and contracts is low and does not materially damage its connection to the underlying structure.

However, the desirable result of eliminating detrimental differential movement between the panel and its support structure on large roofs may also be achieved by construction of the underlying support so that it moves slightly to accommodate the movement of the roof as it is being subjected to movement because of temperature change or other forces. This means of construction is exemplified in a system produced bye ReRoof America, Inc., referred to as the Flex Frame support system.

The interconnection of the panel members of the standing seam roof lend stiffness and strength to a flexible roof structure while allowing the roof structure to expand and contract as a function of the coefficient of expansion of the panel material and the temperature cycles of the roof panels.

If one of the means of using floating clips or of using a fixed connection between the panel and the flexible framing is not used, the repeated action of expansion and contraction of the panel member tends to weaken the panel-to-panel lap joints and the panel to framing connection, causing panel separation, structural failure and roof leakage. Leaks are generally caused by the weakening of the fastening members and working or kneading of the sealant disposed at the joints. Prior art sealant for such roof assemblies requires adhesion, flexibility and water repellence. Further, in many instances the pressure on the sealant varied greatly throughout the length of the sidelap and end lap joints of the panels, resulting in uneven distribution and voids in the joint sealant.

Many of the problems discussed hereinabove encountered in prior art standing seam roofs, such as structural failures and leaks, have been overcome by a standing seam floating roof assembly such as is disclosed in U.S. Pat. No. 5,737,894 issues to Harold G. Simpson. The standing seam floating roof assembly is formed of elongated metal panels, each of which is provided with a female member formed along one longitudinal edge and a male member formed along the opposed longitudinal edge, adjacently disposed panels being joined by interlocking female and male members thereof to form the standing seam joint. Clips interconnect the standing seam joints and the underlying secondary structure, with the upper portions of the clips hooking over the male members of the panels. Most such clips are of the sliding type which permits the hooking portion to move relative to a supporting base portion connected to the secondary structure, while relative motion between the clip hook and the metal panel is substantially prevented. A sealant material is disposed to form a moisture dam in the interlocking joint of the female and male members.

In addition to the use of standing seam roof assemblies on newly constructed pre-engineered buildings., standing seam roof assemblies are also finding increased usage in another segment of the roofing industry, that of "built-up roof" replacement. Generally, a built-up roof is formed of a plurality of sections which are interconnected and overcoated with asphaltic composition to provide a watertight seal. While such substantially horizontal roof assemblies have generally served successfully, problems have nevertheless been encountered as the built-up roof ages, when the building settles, or when construction errors result in water standing in pockets on the roof assembly. This standing water often results in deterioration of the roof, causing leaks and other problems.

A need has long been recognized for a means of replacing a built-up roof, as well as other conventional roofs, which does not require substantial modification to the preexisting roof and which is economical both in fabrication and on-site construction. Further, it is highly desirable that the new roof assembly be capable of providing a new roof surface independent of the variations in the surface of the preexisting roof. Past repair methods, especially those capable of altering the slope of the roof surface to improve drainage characteristics, have required substantial destruction of the original roof and extensive custom construction, thus exposing the building and its contents to damage by the elements during the reroofing process and being excessively time consuming.

SUMMARY OF THE INVENTION

The present invention provides a standing seam roof assembly in which adjacent roof panels are supported by underlying support structure in overlapping edge relationship to form a standing seam between adjacent roof panels. The assembly comprises a first roof panel having a female sidelap portion that forms a male insertion cavity and a second roof panel having a male sidelap portion that forms a standing seam assembly when the male sidelap portion is inserted into the female insertion cavity to form the standing seam assembly. The standing seam assembly prevents unfurling of the first and second roof panels by forming force couples that resist forces due to uplift of the first and second panels.

The preferred embodiment of the invention includes the use of a mastic material that is compressed between portions of the female and male sidelap portions, thereby forming a weathertight seal.

The female and male sidelap portions are interlockingly formed into the standing seam assembly by insertion of the male sidelap portion into the male insertion cavity and a portion of the female sidelap portion is either locked into place by way of elastic deformation, or by inelastic deformation via field roll forming using a conventional field roll forming seaming machine is used to conform the female and sidelap portion to the required configuration for the standing seam.

Accordingly, an object of the present invention is to provide a standing seam roof assembly for adjacent panels of a standing seam metal roof that provides resistance to unfurling and unzipping of the seam due to the exertion of environmental forces upon the roof panels that cause an uplifting force upon the panels.

Another object of the present invention is to provide a standing seam roof assembly with a configuration that resists unfurling and unzipping by producing force couples within the seam that resist the uplifting forces applied to the panels as a result of environmental forces.

Yet another object of the present invention is to provide a clip tab that is resistant to pulling out or separating from the seamed sidelap when the seam is subjected to unfurling and unzipping forces.

Yet another object of the present invention is to provide a one-piece floating clip that is simple at a lower cost that is stronger and more effective in preventing unfurling and unzipping than prior art two piece floating clips.

Yet another object of the present invention is to provide a standing seam roof assembly that provides a weathertight seal.

Still yet another object of the present invention is to provide a standing seam roof assembly that is aesthetically pleasing and does not require the use of external fasteners while providing resistance to unfurling and unzipping comparable to that provided by the use of external fasteners.

Other objects, features and advantages of the present invention will become apparent from the following detailed description when read in conjunction with the drawings and appended claims.

BRIEF DESCRIPTION OF THE DRAWINGS

FIG. 2 is an isometric, partial cut-away view of a portion of a re-roof system utilizing the standing seam roof assembly of the present invention.

FIG. 3 is an end view of the profile of a roof panel member which can be utilized in the roof system of FIGS. 3 and 4.

FIG. 4 is an end view of the profile of an alternative roof panel member which can be utilized in the roof system of FIGS. 1 and 2.

FIG. 5 is an end view of the profile of a portion of the male sidelap portion interlocked with a portion of the female sidelap portion of the roof panel members of FIG. 1 and FIG. 2.

FIG. 6 is an elevational view of the standing seam assembly between adjacent panels in the final formed configuration.

FIG. 7 is an elevational view of a portion of the standing seam assembly of FIG. 6, showing an alternative configuration of the male sidelap portion and the retaining clip.

FIG. 8 is an elevational view of an alternative preferred embodiment of the standing seam assembly of FIG. 6.

FIG. 9 is an elevational view of an alternative preferred embodiment of the standing seam assembly of FIG. 6.

FIG. 10 is an elevational view of an alternative standing seam assembly between adjacent panels in the final formed configuration.

FIG. 11 is an elevational view of an alternative preferred embodiment of the standing seam assembly of FIG. 10.

FIG. 12 is a detail view of a portion of the standing seam assembly of FIG. 11.

FIG. 13 an elevational view of an alternative standing seam assembly between adjacent panels in the final formed configuration.

FIG. 14 is an elevational view of an alternate standing seam assembly of FIG. 6 before the field seaming operation is performed.

FIG. 15 is an end view of a portion of the standing seam assembly of FIG. 6, showing a scalloping condition as a result of not pre-crimping the hook portion of the female sidelap portion.

FIG. 18 is an elevational view of the standing seam assembly of FIG. 8 and FIG. 9 before the field seaming operation is performed.

FIG. 19 is an elevational view of the standing seam assembly of FIG. 10 before the field seaming operation is performed.

FIG. 20 is an elevational view of an alternative embodiment of the seam of FIG. 10 before the field seaming operation is performed.

FIG. 21 is an elevational view of a portion of the female sidelap portion showing an alternative preferred embodiment of the standing seam assembly of FIG. 19 wherein the female sidelap portion and the male sidelap portions are staked together.

FIG. 22 is an end view of the staking operation of FIG. 21.

FIG. 23 is an elevational view of an alternative preferred embodiment of the standing seam assembly of FIG. 10.

FIG. 24 is a detail view of a portion of the standing seam assembly of FIG. 23.

FIG. 25 is an elevational view of the standing seam assembly of FIG. 13 prior to the field seaming operation.

FIG. 26 is an elevational view of the standing seam assembly of FIG. 13 at an intermediate configuration during the field seaming operation.

FIG. 27 is an isometric view of a two-piece roof clip assembly.

FIG. 28 is an end view of the hold down clip portion of the two-piece clip assembly of FIG. 27.

FIG. 29 is an end view of the two-piece roof clip assembly of FIG. 27.

FIG. 30 is an elevational view of the roof system of the present invention, employing the roof members of FIG. 4 attached to the underlying roof structure by the two-piece roof clip of FIG. 27.

DETAILED DESCRIPTION

The present invention is used generally in providing a building roof having a characteristic standing seam. The standing seam roof may be used in the construction of a pre-engineered building roof, as a portion of a conventional building, or alternatively the standing seam roof may be used in the construction of a roof system constructed in order to reroof over a preexisting roof or in other building construction.

Figure 1:
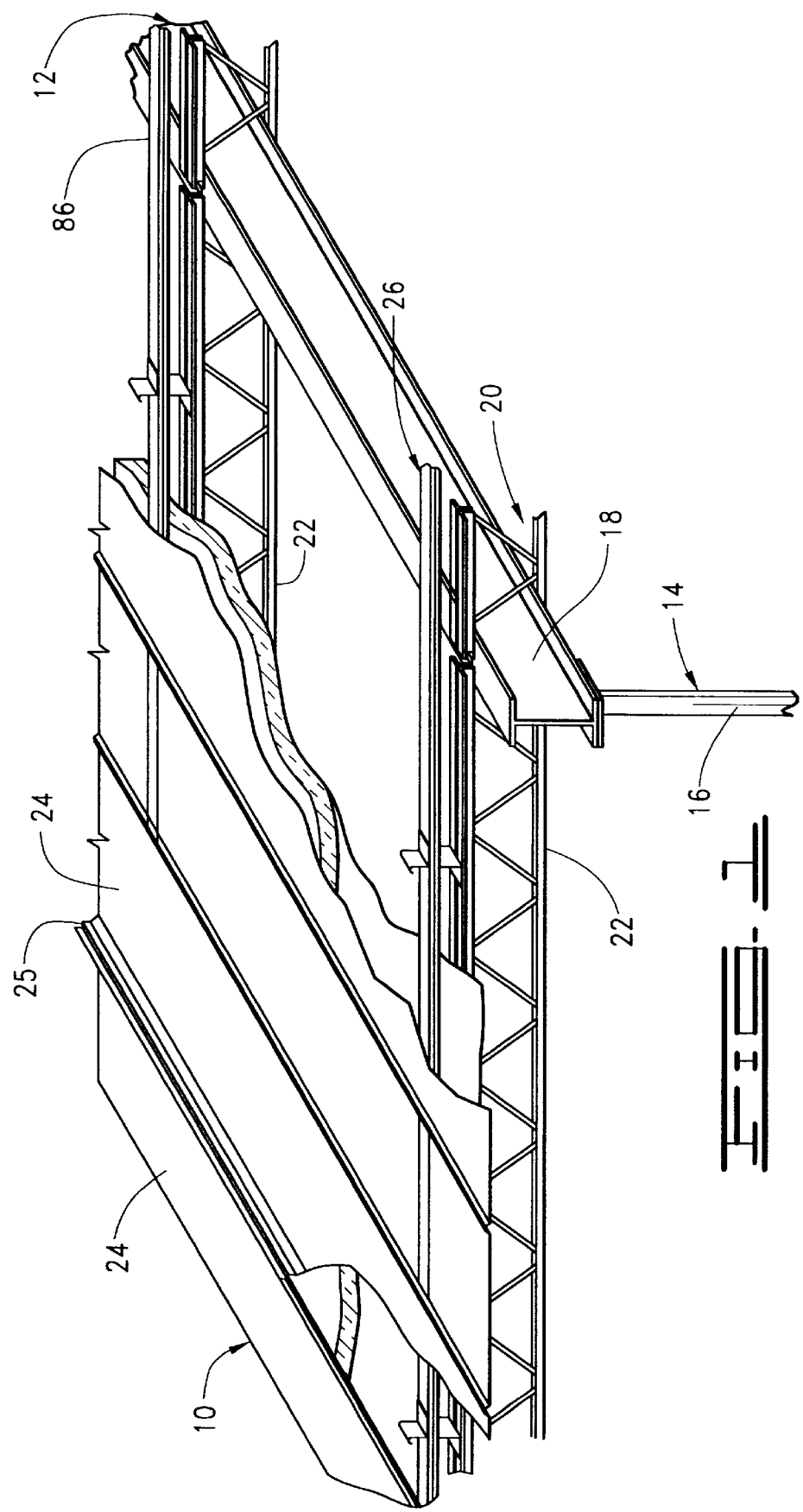
FIG. 1 is an isometric, partial cut-away view of a portion of a roof system utilizing the standing seam roof assembly of the present invention.

FIG. 1 shows a partial cut-away view in which a portion of a pre-engineered building roof 10 is supported by a pre-engineered building structure 12. The pre-engineered structure 12 comprises a primary structural system 14 which consists of a plurality of upwardly extending column members 16 that are rigidly connected to a foundation (not shown). Also, the primary structural system 14 has a plurality of primary beams 18 which are generally sloping and supported by the column members 16.

A secondary structural system 20 comprises a plurality of open web beams 22, also referred to herein as bar joists, which are supported by the primary beams 18 and are generally horizontally disposed. While C or Z purlins or wood beams could as well be used as the secondary structurals in the practice of the present invention, FIG. 1 shows the present invention supported on the bar joists 22.

A plurality of roof panels 24 are supported over the secondary structural assembly 20 by a plurality of panel support assemblies 26 described further hereinbelow, and which are attached to the upper flanges of the bar joists 22. The roof panels 24, only portions of which are shown, are depicted as being standing seam panels, with their interlocking edge standing seams 25 being supported by clip portions of the panel support assemblies 26, as will become clear below.

As described above, the building roof may alternatively be supported above an existing roof in a re-roof installation. FIG. 2 shows a portion of a roof system 10A supported by a preexisting roof 28 of a building structure 30. The preexisting roof 28 of the building structure 30 can be any preexisting roof structure, such as a built-up roof, which is connected to and supported by conventional elements, such as a primary and secondary structural systems as shown in FIG. 1, and a plurality of wall members 32.

Whether a new roof as in FIG. 1, or a reroof as in FIG. 2, the roof panels 24 are secured at the interlocking side lap joints and at the end overlap of contiguous panels. Fastener penetration of the panels, except at the end overlaps and roof perimeters, is avoided to minimize leakage points. To obtain watertightness at points of attachment of the roof panels 24 to underlying structure, panels must be permitted to expand and contract in relation to the underlying structure or the panels and the underlying structure must be permitted to move in unison without unduly straining or fracturing the panel. This may be accomplished by limiting the length of the panels or by utilizing support structures sufficiently flexible to allow the attachment means to move with the expanding or contracting panel. The flexibility of the support structurals must be greater for longer panel runs because, other factors being equal, the expansion or contraction of the panels will be greater.

Past practice has been to attach the center and sidelap joints with either penetrating or non-penetrating fasteners. For non-penetrating clips, past clip practice has been to use either a fixed or sliding clip with a minimum length contact surface between the hold-down portion of the clip and the top of the male leg of the seam. The length of the clip has been held to a minimum, resulting in stress concentrations in the panel at the point of attachment, leading to severe distortion in the panel joints as the panels are subjected to wind uplift.

In prior art standing seams, the standing seam clip bears only on the male seam portion of the panel inserted into the adjacent female seam portion. The female seam portion is not retained directly by the clip and as a result the load from the female seam portion must pass through the male seam portion and then into the clip where it can, in turn, pass to the secondary structural. This action tends to "unravel" or "unzip" the panel joint and allow distortions over the short section retained by the clip. This has resulted in premature panel failure when subjecting such panels to wind uplift.

A roof panel is usually attached to underlying supporting structure in a manner that causes the panel to act as a three or four span continuous beam. This arrangement substantially reduces the maximum moment occurring at any one point compared to the moment that would occur in a simple beam, other factors being equal. However, this means of construction causes a negative moment to occur at the attachment point. This negative moment peaks and drops off very quickly as the panel section under consideration moves from the center line of the attaching clip towards the point of inflection (P.I.), the P.I. being that point where the moment in the panel changes from positive to negative.

Past center hold-down practice has been to coordinate usage of floating clips with eave and ridge hold-down practice so that if floating clips were used to attach the center of the panel to the underlying structural, then fixed clips were used to attach the eave or ridge portions of the panel to the underlying structurals; and conversely, if the panel edge attachment consisted of a floating, (two-piece, moveable) non-penetrating attachment means, such as a clip, then the center hold-down was a fixed attachment. However, past non-penetrating floating hold devices heretofore have largely been complex and expensive.

The effectiveness of non-penetrating center hold-down devices is influenced by the number and height of corrugations formed in the panel and the width, thickness and strength of the metal laterally separating the corrugations. The configuration and number of panel corrugations in turn has a direct impact on the efficiency of material utilization, which in turn is a primary cost factor. Conventional standing seam roofs may only achieve a flat-width-to-coverage ration as low as 1.25:1 where through fasteners exist only at panel end laps and do not occur at the panel centers. Oil the other hand, non-standing seam panels with penetrating center hold-down fasteners are commonly 36" wide and may achieve flat-width-to-coverage ratios as low as 1.17:1.

FIG. 3 is an elevational view of a roof panel 24 used in the roof assembly of the present invention, having a substantially flat pan profile between a female sidelap portion 34 and a male sidelap portion 36. The medial portion of the roof panel 24 may have a number of corrugations 38 of a selected height for the purpose of stiffening the panel. FIG. 4 shows an alternative embodiment of a roof panel 24A invention having trapezoidal sidelap portions 34A, 36A to improve the panel material utilization in relation to roof coverage. That is, all else being equal, the roof panel 24 of FIG. 3 requires a wider sheet metal blank than does the roof panel 24A of FIG. 4.

Adjacent roof panels 24 are interlocked with the female sidelap portion 34 wrapped around the male sidelap portion 36, as shown in FIG. 5. It will be noted that the outwardly angled leg 40 having a hook 42 at a distal end thereof provides for a sliding engagement of the hook 42 past a tang portion 44 of the male sidelap portion 36 as the two adjacent roof panels 24 are joined. In this manner, the panel profile of the present invention provides for an easier assembly method for initially assembling and interlocking the male sidelap portion 36 with the female sidelap portion 34, wherein the female sidelap portion 34 can substantially be dropped vertically onto the male sidelap portion 36. This provides a superior method of joining panels in comparison to the well known method of "roll-to-lock" wherein one panel must be rotated upwardly in order to interlock and then rotated downwardly into a final position.

It will be further noted that FIG. 5 shows the interlocked adjacent roof panels 24 in an unseamed condition, that is, mechanical seaming is necessary to provide the final relationship between the male sidelap portion 36 and the female sidelap portion 34. An attachment clip may also be gripped between the male sidelap portion 36 and the female sidelap portion 34 for attachment to the underlying roof structure as will be discussed in detail below.

Turning now to FIG. 6 where the standing seam 25A of a roof assembly constructed in accordance with the present invention is shown with a roof clip 46 sandwiched between the female sidelap portion 34 and the male sidelap portion 36, after having been field formed by a seaming operation.

The female sidelap portion 34 has a first leg portion 48, a first radiused portion 50, a second leg portion 52, a second radiused portion 54, and a third leg portion 56 which together form a first female cavity 58 and a second female cavity 59 (also referred to as the first and second male insertion cavities), for receiving disposition of the male sidelap portion 36. A retaining groove 60 is disposed at a distal end of the third leg portion 56, and an extended leg portion 62 extends from the third leg portion 56 to from the retaining groove 60 there between as shown in FIG. 6.

The male sidelap portion 36 has a fourth leg portion 64, a third radiused portion 66, a fifth leg portion 68, a fourth radiused portion 70, and a sixth leg portion 72, also referred to as the tang member 72, disposed in the female cavity 58; the radiused portion 70 disposed in the second female cavity 59; and, a distal end of the tang member 72 receivingly disposed in the retaining groove 60.

The roof clip 46 is sandwiched between the female sidelap portion 34 and the male sidelap portion 36 in the second female cavity 59, having a radiused portion 74 that lockingly engages the fourth radiused portion 70 of the male sidelap portion 36, the roof clip 46 thereby attaching the male sidelap portion 36 to the underlying building structural system as will be explained in detail below. The retaining groove 60 and extended leg portion 62 of the female sidelap portion 34 lockingly engage the roof clip 46 and is retained thereby to the underlying building structural system. A mastic material 76 is disposed in the retaining groove 60 and sealingly engages the roof clip 46 and the tang member 72 to provide a watertight seal of the members forming the standing seam 25A.

In the installed mode of the standing seam 25A, that is after field seaming as shown by FIG. 6, the standing seam 25A has a triple lock integrity. That is, the standing seam 25A formed by the interlocking engagement of the female and male sidelap portions 34, 36 is secured by the radiused portion 66 in the radiused portion 50; the radiused portion 70 in the radiused portion 54; and the locking tang 72 in the retaining groove 60. That is, in addition to the aforementioned locking engagements of the standing seam 25A, the tang member 72 acts as a locking tab that lockingly engages the retaining groove 60 to resist uplift forces that tend to unfurl or unzip the standing seam 25A. As the panels forming the standing seam 25A are subjected to uplift forces, pivoting disengagement is attempted by the separation of these members, and as this occurs, the tang member 72 and retaining groove 60 permit some upward flexing of the adjacent roof panels 24 while maintaining the latching integrity of the sidelap portions 34, 36 and closure of the standing assembly 25A.

FIG. 7 shows a portion of an alternative preferred embodiment of the standing seam 25A of FIG. 6, wherein the retaining groove 60 contains a mastic 76 but only the tang member 72A sealingly engages the mastic 76. The tang member 72A forms a shoulder 78 which pressingly engages an opposing shoulder 80 formed by a distal end of the roof clip 46A. In this manner the roof clip 46A abuttingly engages the male sidelap portion 36A to provide a positive support thereof. The positive engagement of the roof clip 46A against the tang member 72A provides a standing seam assembly that does not require field seaming of the distal end of the seam, that is, the retaining groove 60A can be preformed and the male sidelap portion 36A and the roof clip 46A simply formed together and placed into the retaining groove 60A. Such an assembly simplifies installation by reducing the field seaming operation to one simple bend of the assembly at radii 54, 70, and 72.

Another advantage is provided by the roof clip 46A not engaging the mastic 76, allowing the roof clip 46A to float without disrupting the seal provided by the mastic 76. The advantage of not sealingly engaging the roof clip 46A in the mastic 76 will become more apparent in the discussion of a two-piece roof clip 46 below.

FIG. 8 shows another preferred embodiment of the standing seam 25B of the present invention, wherein like the standing seam 25A the second leg portion 52B is substantially perpendicular to the first leg portion 48B. Here, however, the roof clip 46B has a retaining groove 82 which receivingly engages the tang member 72B of the male sidelap portion 36B, and wherein the retaining groove 82 is disposed in the retaining groove 60B of the female sidelap portion 34B. It will be noted also that the mastic 76 is located at the ends of the female sidelap portion 34B and roof clip 46B, as well as within the retaining groove 60B.

FIG. 9 shows another preferred embodiment of the standing seam 25C wherein the seam of FIG. 8 is then rotated or formed downwardly in the seaming operation to create an acute angle with respect to the first leg portion 48C. Such a seam provides a tighter, stronger, and more watertight seam because the over-bending requires a longer arc length for the first radiused portion 50C which tends to draw the retaining groove 60C more tightly against the tang member 72C.

FIG. 10 shows another preferred embodiment of the standing seam 25D wherein the roof clip 46D grippingly engages the male sidelap portion 36D at a radiused portion 82 when the panel is subjected to uplift loads. This separates the support of the roof clip 46D from the seamed portion so that the clip is not inserted in the sealingly engaged ends of the female sidelap portion 34D and male sidelap portion 36D. A number of serrated teeth 84 may be provided in the roof clip 46D to improve the gripping action on the male sidelap portion 36D. In the normal position the serrated teeth 84 do not engage the male sidelap portion 36D.

Clip 46D provides several advantages. It is simple to manufacture, can be made from heavy stiff material and provides for movement between the panel and the clip thus replacing more expensive complex two-piece floating clips.

FIG. 11 shows another preferred embodiment of the standing seam 25E which, like the standing seam 25D of FIG. 10, separates the engagement between the roof clip 46E and the male sidelap portion 36E from the sealingly engaged ends of the male sidelap portion 36E and the female sidelap portion 34E. This separation provides for transfer of uplift forces from the clip into the male seam as shown in FIG. 12, wherein the tang member 72E has a distal end disposed in the mastic material 72 which is disposed in the retaining groove 60E, both of which move in unison as the panels expand and contract in relation to the clip.

All the standing seams 25 discussed so far have had a female sidelap portion 34 which forms a retaining groove 60 that lockingly engages a tang member 72 of the male sidelap portion 36. This engagement tends to drive the tang member 72 into ever more pressing engagement with the retaining groove as uplift forces tend to separate the first leg portion 48 of the female sidelap portion 34 from the fourth leg portion 64 of the male sidelap portion 36. The locking characteristic of this seam is not limited to seams having female sidelap portions 48 which form the retaining groove 60, for it is an equivalent embodiment to have the male sidelap portion 64 form the retaining groove 60.

FIG. 13 shows an embodiment of the standing seam 25F wherein the male sidelap portion 36F has a first leg portion 86, a first radiused portion 88, and a second leg portion 90, wherein a distal end of the second leg portion 90 forms a retaining groove 91. The female sidelap portion 34F has a third leg portion 92, a second radiused portion 94, a fourth leg portion 96, a third radiused portion 98, a fifth leg portion 100, a fourth radiused portion 102, and a sixth leg portion 104, the sixth leg portion 104 sometimes referred to as the tang member 104 in the following. It will be noted that as before a mastic material 76 sealing engages the ends of the female sidelap portion 34F and the male sidelap portion 36F, and that a roof clip 46F is shown having a distal end which wraps around the male sidelap portion 36F for locking engagement thereof.

In the seamed configuration shown in FIG. 13, the tang member 104 has a distal end receivingly disposed in the retaining groove 91 of the male sidelap portion 36F. Uplift forces which tend to separate the first leg portion 86 of the male sidelap portion 36F from the third leg portion 92 of the female sidelap portion 34F will drive the tab member 104 into ever more pressing engagement with the retaining groove 91, thereby resisting the unfurling or unzipping of the seamed joint. This is discussed more fully below.

Having discussed the configuration of the characteristic locking engagement of the tang member and the retaining groove of the roof panel of the present invention, attention now is directed to the method of field seaming the standing seam and of attaching the standing seam to the underlying roof structure.

FIG. 14 shows the standing seam 25A of FIG. 6 in the unseamed condition. During assembly, the roof clip 46 is placed over the male sidelap portion 36 and the female sidelap portion 34 is placed over both. In this manner, the hook 42 of the female sidelap portion 34 deflectingly passes by the tang member 72 of the male sidelap portion 36 and is positioned therebelow. It will be noted the mastic material 76 is supported within the female sidelap portion 34 before field seaming.

The roof clip 46 shown in FIG. 14 is of a two-piece construction having an attachment end 106 with an aperture 108 through which a fastener 110 is attached in threading engagement with the underlying structure, such as in the attachment of the roof clip 46 to a panel support assembly 26 or directly to a bar joist 22. The roof clip 46 may have a support shelf 112 for supporting the male sidelap portion 36 during standing seam 25A assembly and seaming. The roof clip 46 furthermore has an upstanding web portion 114 which supports the tang member 72 at a distal end thereof.

Figure 16:
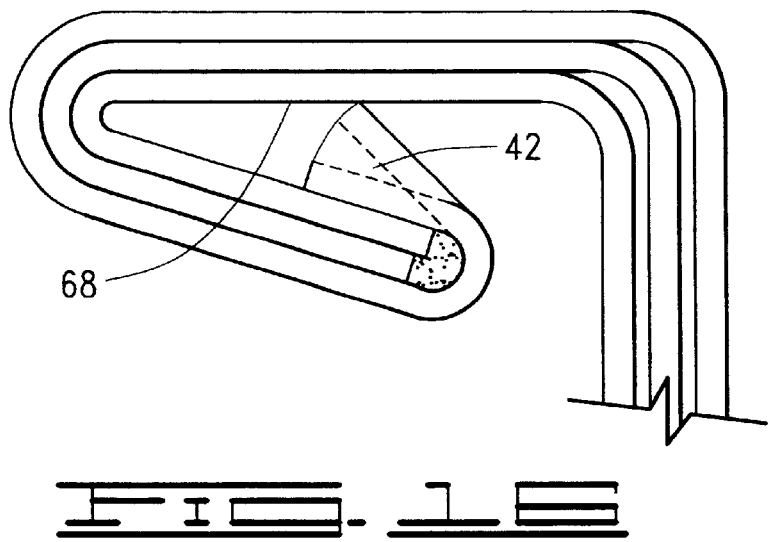
FIG. 16 is an end view of a portion of the standing seam assembly of FIG. 6, showing the scalloping condition of FIG. 14.
Figure 17:
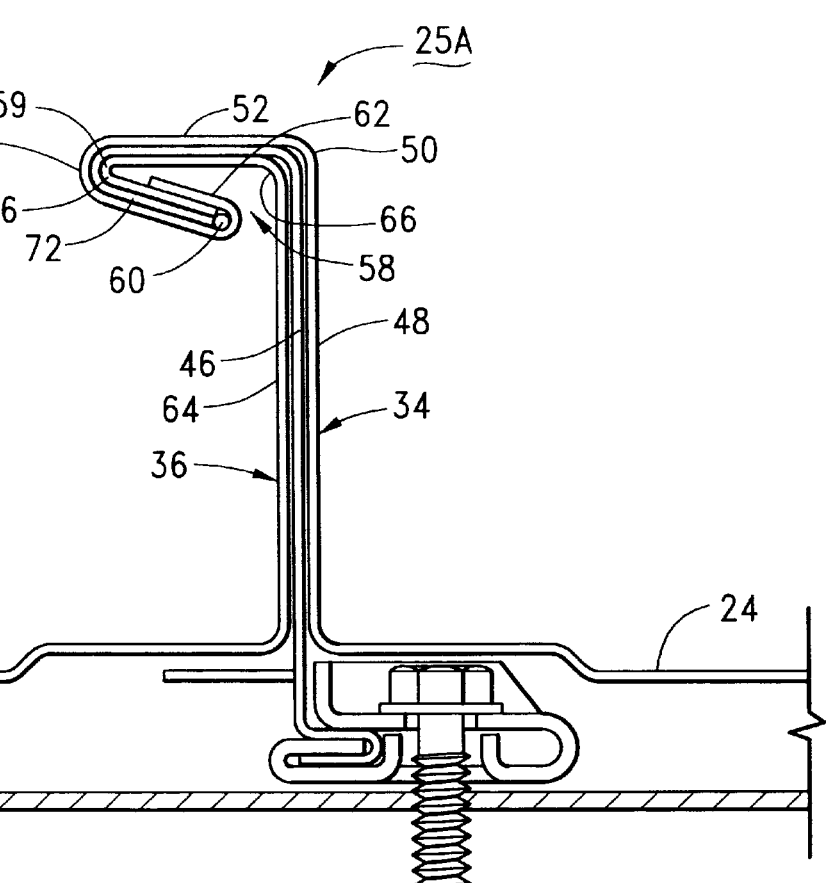
FIG. 17 is an elevational view of a standing seam assembly of FIG. 6 after field forming and attachment to the underlying roof structure.

In the seaming operation it is necessary to prevent the edge of the hook 42 of the female sidelap portion 34 from distorting in a manner that creates a scalloped edge, such as that shown in FIGS. 15 through 17. Such a scallop increases the effective width of the seamed joint which, if too wide, will interfere with the forming of the desired included angle of the second radiused portion 54 (see FIG. 17) because the scalloped edge of the hook 42 will contact the fifth leg portion 68A of the male sidelap portion 36 as is shown in FIG. 16. To prevent the scalloped edges and interference it is possible to pre-crimp the hook 42 against the tang member 72 before forming the desired included angle within the second radiused portion 54. While FIG. 17 shows the standing seam 25A in its final seamed position and in its attachment to the underlying roof structure, it will be understood that the angular disposition of the legs 52, 56, 62 (of the female sidelap portion 34), the legs 68 and locking tang 72 (of the male sidelap portion 36) and the corresponding legs of the clip 46 can be angularly determined during the seaming process as desired and can be angularly disposed such as that depicted in FIG. 9.

Similarly, FIG. 18 shows the standing seam 25B of FIG. 8 in an unseamed position, whereby both the hook 42 of the female sidelap portion 34B and the hook portion of the roof clip 46B deflectingly pass by the tang member 72B of the male sidelap portion 36B, in order to wrap around the tang member 72B after seaming. FIG. 19 similarly shows the standing seam 25D of FIG. 10 in an unseamed mode. FIG. 20 shows an alternative embodiment of the standing seam 25D wherein the mastic sealant 72 is provided in two places, first at the distal ends where the female sidelap portion 34D and the male sidelap portion 36D are crimped together, and second between the second leg portion 52D and the fifth leg portion 68D. FIG. 21 and FIG. 22 show an alternative embodiment wherein the third leg portion 56F of the female sidelap portion 34F and the tang member 72F of the male sidelap portion 36F are mechanically staked together by an upset crimp 116.

FIG. 23 shows an improvement to the standing seam 25G of FIG. 10, wherein the male sidelap portion 36G forms a wedge-shaped portion 118 that is disposed inside the hook 120 of the roof clip 46G. Uplift forces cause the male sidelap portion 36G to rise and to rotate clockwise and the female sidelap portion 34G to rotate counter-clockwise, thereby wedging the wedge-shaped portion 118 into the cavity of the hook 120. At a selected amount of wedging displacement a notch 122 (see FIG. 24) receivingly engages the leading edge of the hook 120 of the roof clip 46G and mechanically locks the two together to enhance the lockability therebetween to ensure the roof clip 46G does not disengage the male sidelap portion 36G.

FIG. 25 shows the standing seam 25F of FIG. 13 in an unseamed mode. The seaming operation rotates the tang counter-clockwise and urges the tang member 104 and the distal end of the roof clip 46F around the distal end of the male sidelap portion 36F, (see FIG. 26), with the distal end of the tang member 104 receivingly engaged in the retaining groove 91 in the final seamed mode.

FIG. 27 shows an alternative two-piece roof clip 122, which has a hold down clip 124 as well as a clip base 126 to which the hold down clip 122 is attached. The clip base 126 has a beam section 128 and an upwardly pointing flange portion 130 having a top flange surface 132. The beam section 128 and flange portion 130 slidingly support the hold down clip tab 124 to limit vertical movement thereof, and to provide for longitudinal movement of the hold down clip tab 124 relative to the clip base 126 along the beam section 128. More particularly, the hold down clip has a first tab member 134 that slidingly engages an inside surface 136 of the beam section 128, and a pair of second tabs 138 that slidingly engage an opposing outer surface 140. A third pair of tabs 142 extend from the first tab member 134 and slidingly engage the flange surface 132. In this manner, the flange surface 132 essentially provides a track on which the hold down clip 124 slides in a longitudinal direction.

FIG. 28 shows the hold down clip 124 before being installed to the clip base 126, which is accomplished by inserting the first tab member 134 and the second tabs 138 around the beam section 128 of the clip base 126. The first tab member 134 is formed upward and a distal end thereof place inside the beam section 128. The second tabs 138 are formed downward to engage the beam section 128 in opposition to the first lab member 134. FIG. 29 shows the hold down clip 124 installed in this manner on the clip base 126.

The clip base 126 may be formed from a single piece of sheet metal formed as shown so as to include rib sections 142 and embossments 144 to provide additional strength and resistance to distortional forces upon the clip base 126.

The base of the clip base 126 is anchored to the underlying structure, such as a purlin, using conventional hardware such as a screw (see FIG. 30). More particularly, fasteners are placed through openings 146 in a bottom facing flange 148 of the clip base 126. To provide a solid connection of the base over the thermal insulation above the purlin, the flange portion 148 is formed with feet 150 that extend downwardly at an angle substantially normal to the flange portion 148 and which thereby easily compress the thermal insulation so as to bear solidly on the purlin. The feet 150 are formed by punching square holes through the flange portion and forming opposing sides of the square downward. Additionally, a back edge 152 of the flange portion 148 is formed downwardly to provide a foot 154 that acts in cooperation with the feet 150 to support the flange portion 148.

Finally, FIG. 30 shows the standing seam 25B formed of adjacent panels having trapezoidal sidelap portions and secured to the underlying roof structure with a two-piece roof clip 122 of FIG. 27. It will be noted that all the exemplary standing seam 25 configurations discussed hereinabove can be used with either flat pan or trapezoidal sidelap portions, and with either a one-piece roof clip 46 or a two-piece roof clip 122.

FIGS. 31–38

Having discussed the several preferred embodiments of the standing seam 25, as well as the alternative sidelap portion configurations and roof clip configurations, attention is now directed to a novel method of seaming the standing seam 25 during field installation of a standing seam roof.

As discussed above, the standing seam 25 requires a pre-crimping operation of the hook 42 of the female sidelap portion 34 prior to jointly forming the tang member 72 of the male sidelap portion 36 and the third leg portion 56 of the female sidelap portion 34 to the desired angle at the first radiused portion 50 and second radiused portion 54. This prevents scalloping of the edge of the hook 42 as discussed above and shown in FIG. 16.

Figure 31:
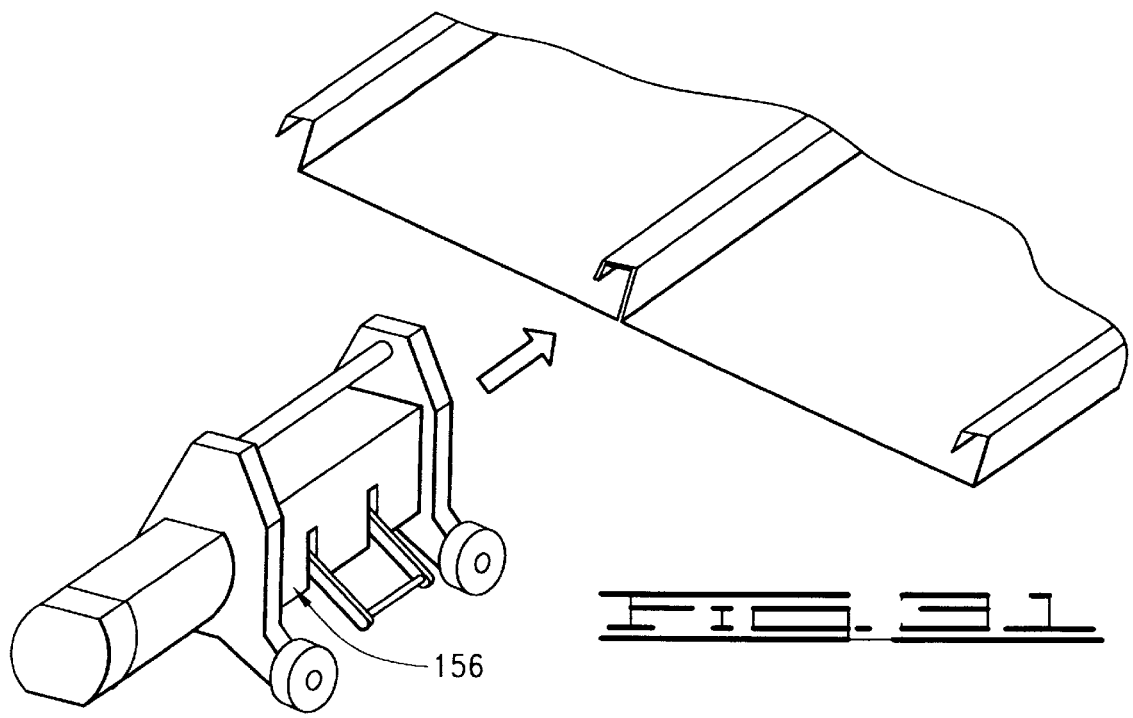
FIG. 31 is a diagrammatic view of a conventional seaming machine.
Figure 32:
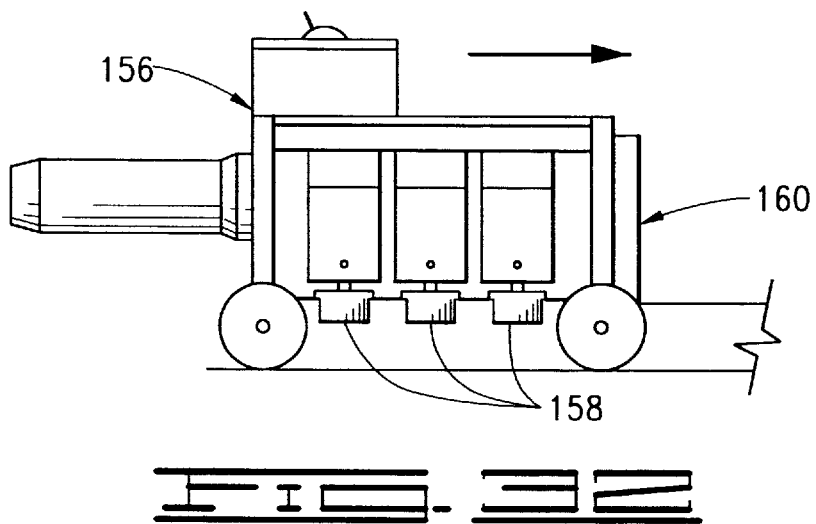
FIG. 32 is a side view of the seaming machine of FIG. 31 with the pre-crimping attachment installed.
Figure 33:
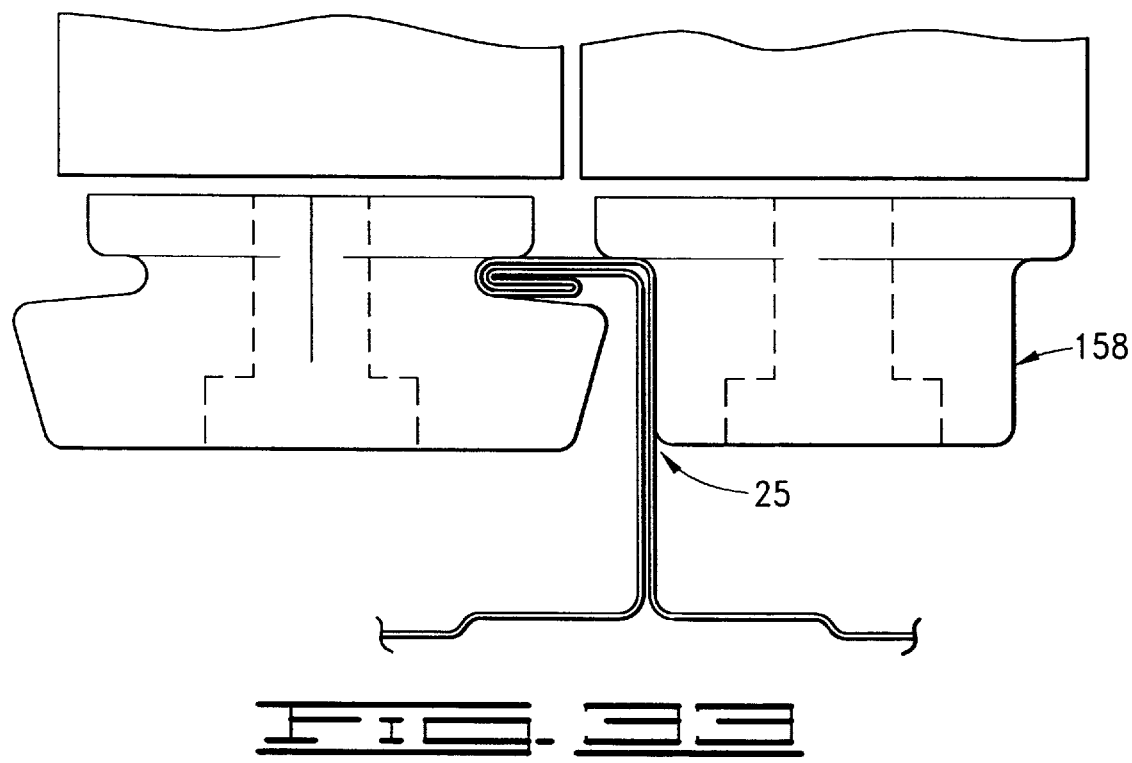
FIG. 33 is an elevational view of a set of rollers of the seaming machine of FIG. 31.

FIG. 31 shows a conventional seamer apparatus 156 that is widely known and used in the art to perform seaming operations on standing seam roofs. FIG. 32 is a side view of the seamer 156, which typically employs a series of rollers 158, usually three sets, to progressively form the standing seam with the pre-crimper attached to the front plate. One method of adding the needed preforming operation to the seamer 156 shown in FIG. 32 is to add another set of rollers, but to do so would require relatively expensive modification in order to extend the chassis and gear mechanisms. An alternative approach is to provide a bolt-on attachment supporting an additional set of pre-crimping rollers to the front of the existing chassis of the seamer 156.

Figure 34:
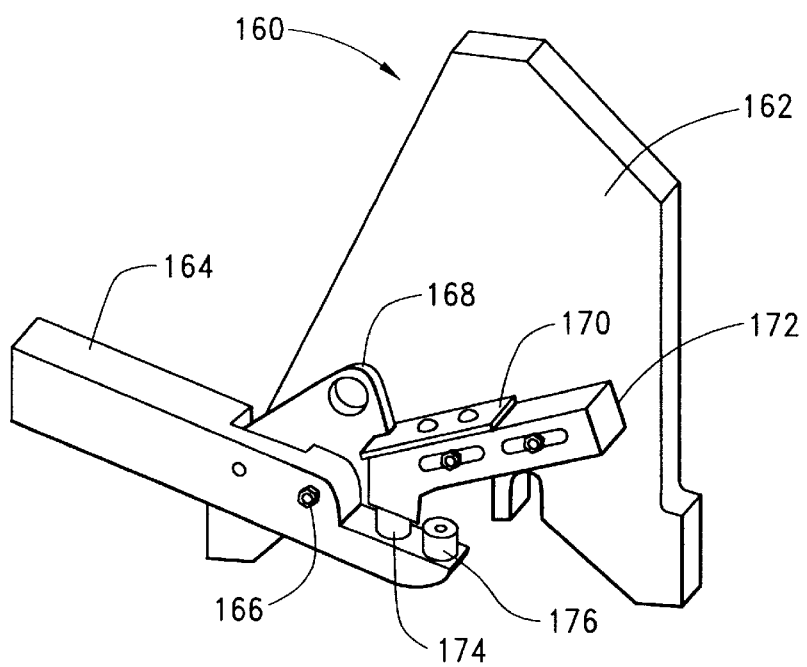
FIG. 34 is an isometric view of a pre-crimping assembly attachment for use with the seaming machine of FIG. 31.

FIG. 34 shows an isometric view of a pre-crimping assembly 160 that is attachable to the seamer 156 for use on a standing seam roof having flat pan sidelap portions, such as a roof constructed with the panel shown in FIG. 3. The pre-crimping assembly 160 has a support plate 162 that is a part of the conventional prior art seamer and which supports a handle 164 which pivots about an eccentric bushing 166 which depends from the support plate 162, a latch 168 pinned to the handle and lockingly engageable with a latch plate 170, and a roller bracket 172 supported by the support plate 162 and supporting, in turn, the latch plate 170. The roller bracket 172 supports a first cam roller 174, and the handle 164 supports an opposing second cam roller 176.

Figure 35:
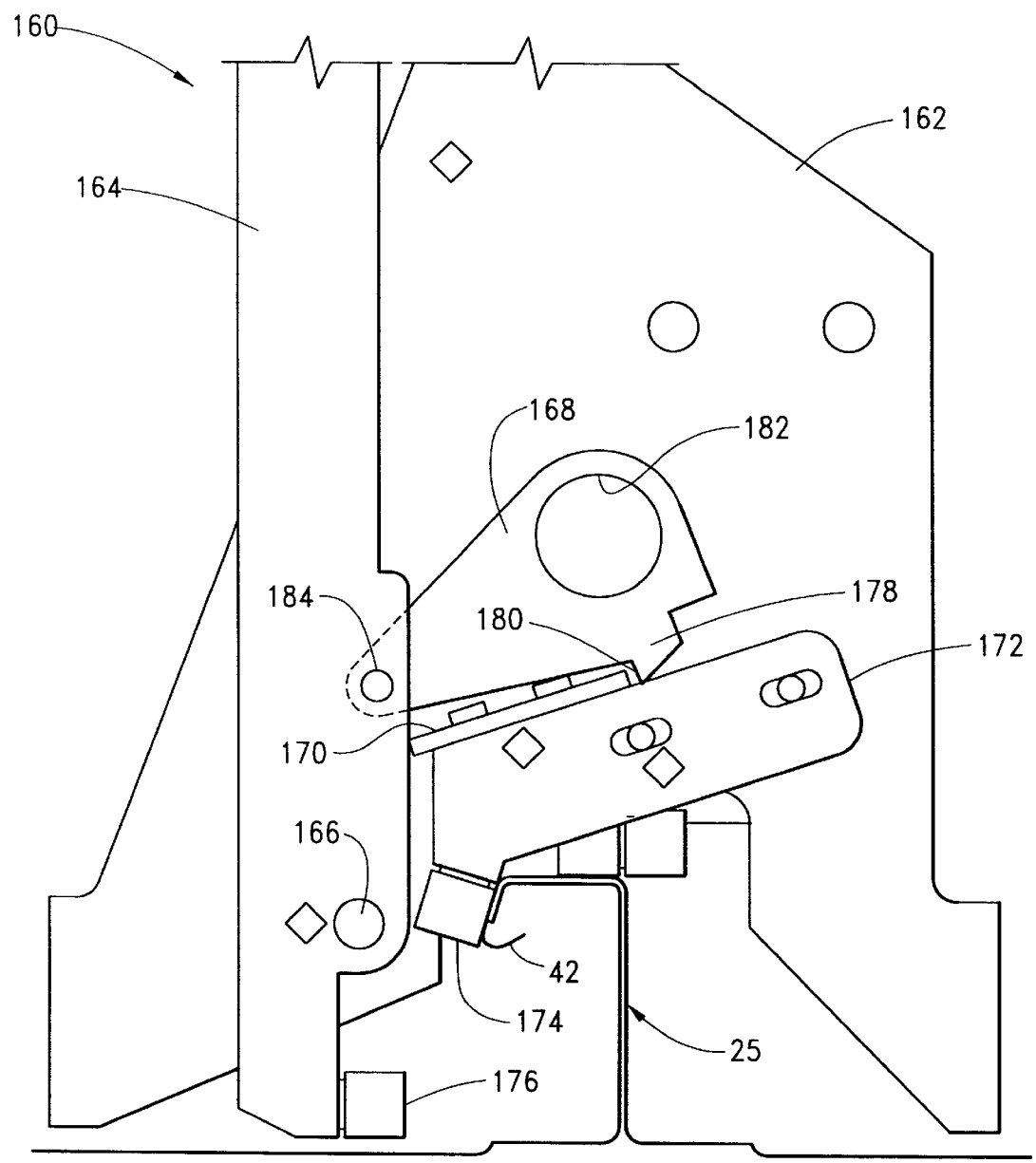
FIG. 35 is an elevational view of the pre-crimping assembly of FIG. 34 for use on the standing seam assembly of FIG. 3, the pre-crimping assembly shown in an open mode.
Figure 36:
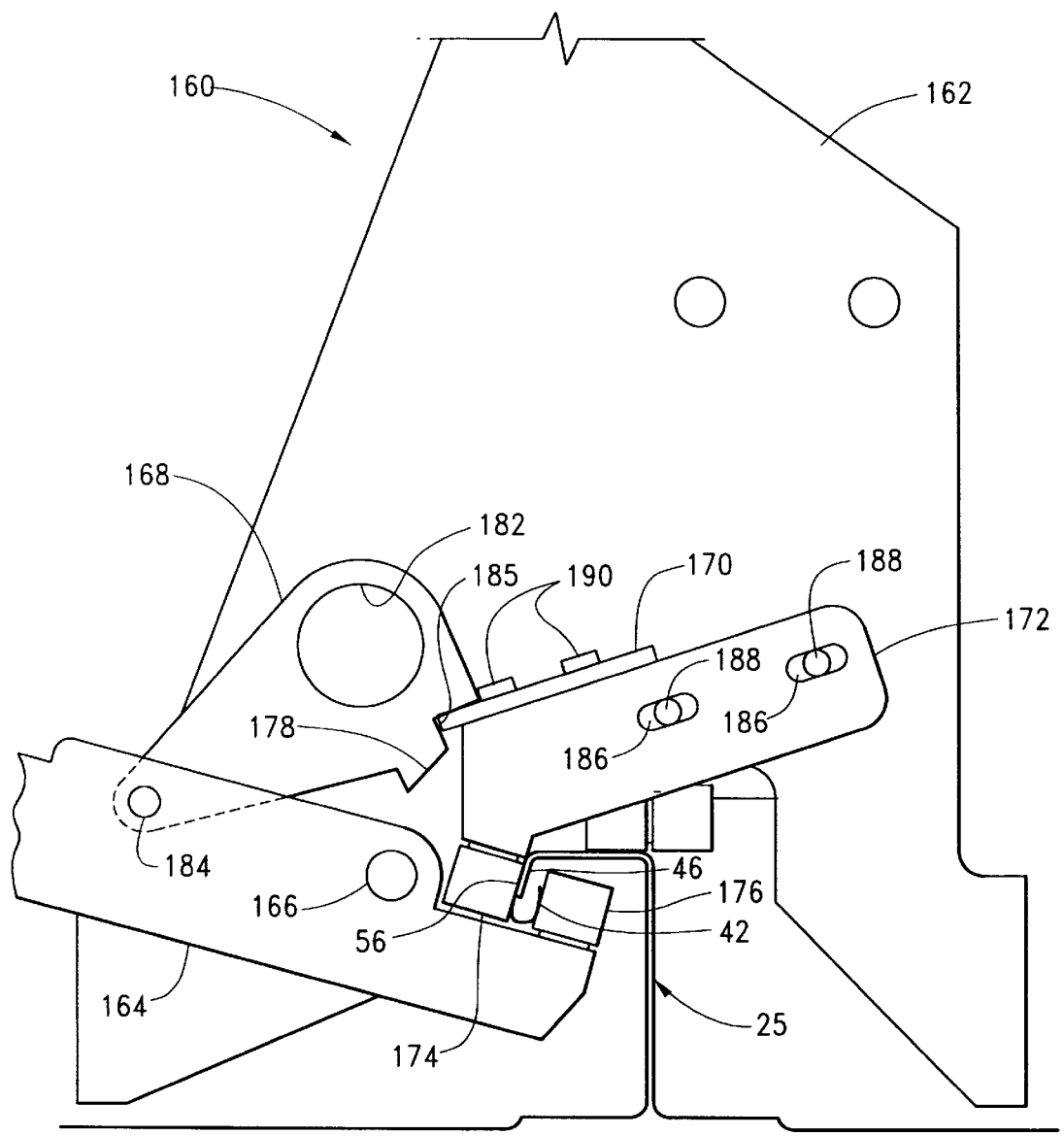
FIG. 36 is an elevational view of the pre-crimping assembly of FIG. 34 for use on the standing seam assembly of FIG. 3, the pre-crimping assembly shown in a closed mode.

FIG. 35 is an elevational view of the pre-crimping assembly 160 operably positioned adjacent a standing seam 25 and in an open position, whereby the latch 168 has a locking gear 178 having a surface 180 abuttingly engaging the latch plate 170 to maintain a substantially vertical position of the handle 164 and thus a retraction of the second cam roller 176 from the standing seam 25. The latch 168 has a finger hole 182 to facilitate the lifting thereof about a pin 184 supported by the handle 164, thereby disengaging the locking gear 178 from the latch plate 170. This allows the handle 164 to rotate about the eccentric bushing 166 to position the second cam roller 176 into operable engagement with the hook 42 of the female sidelap portion 34, as is shown in FIG. 36 which shows the pre-crimping assembly 160 in a closed position. The handle 164 is maintained in the closed position by the pressing engagement of a surface 185 of the locking gear 178 against the latch plate 170.

In use, the modified seamer 156 is placed in the open position and positioned adjacent the standing seam 25 to be field seamed. The roller bracket 172 is adjustably positionable by a slot 186 and threaded fastener 188 arrangement. The roller bracket is thus positioned so that the first cam roller 174 touches the third leg portion 56 of the female sidelap portion 34. The latch 168 is then raised and the handle 164 is lowered to place the second cam roller 176 parallel to the first cam roller 174, and spaced approximately 5/32" therefrom. The latch plate has a slot (not shown) and threaded fastener 190 arrangement, like the roller bracket 172 attachment to the support plate 162. The latch plate 170 is thus adjusted to provide a locking engagement with the locking gear 178 of the latch 168 to maintain the desired position of the second cam roller 176.

Figure 37:
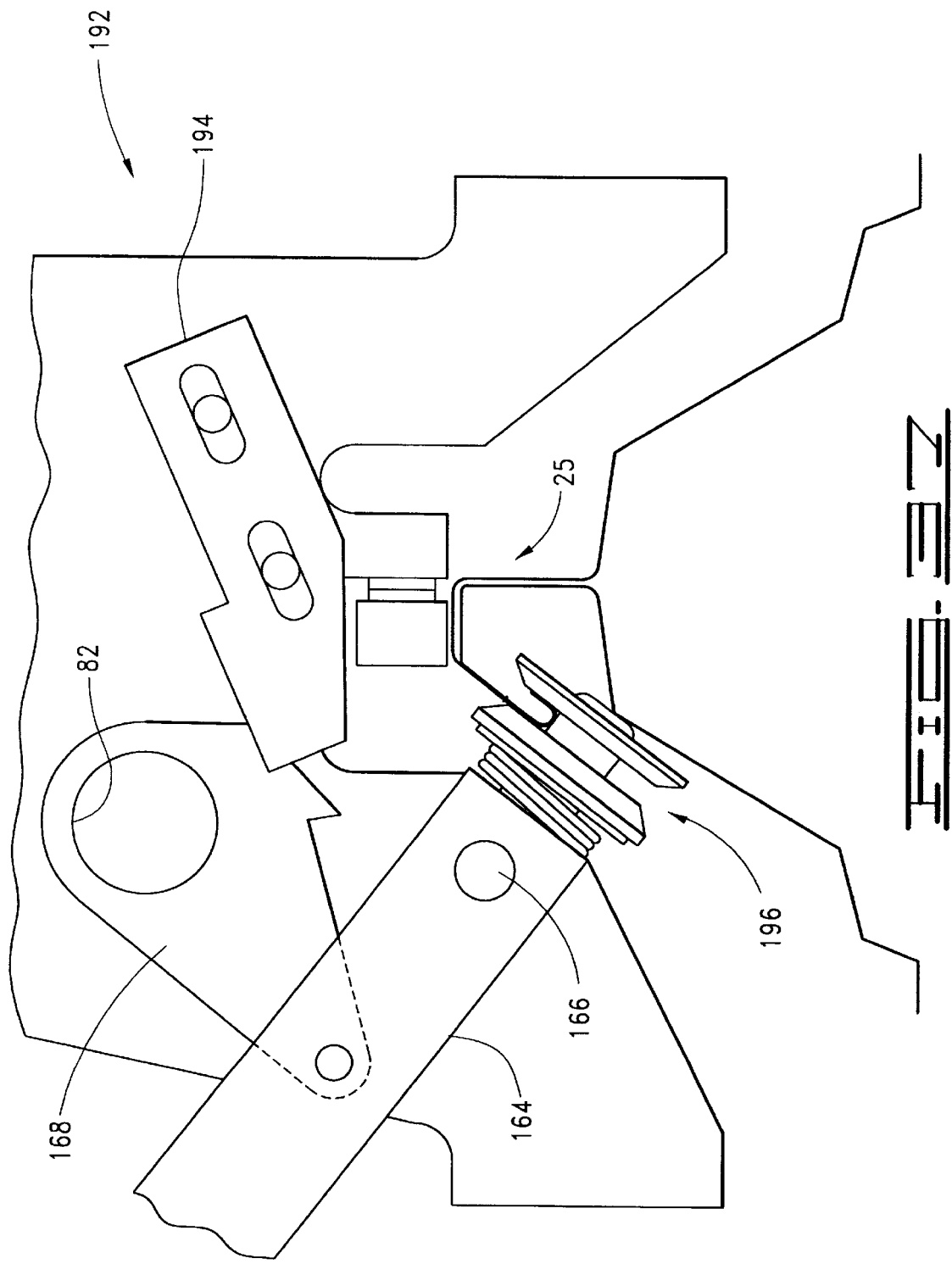
FIG. 37 is an elevational view of a pre-crimping assembly for use on the standing seam assembly of FIG. 4, the pre-crimping assembly shown in a closed mode.

FIG. 37 shows a pre-crimping assembly 192 for use on a standing seam roof panel having trapezoidal sidelap portions, such as the panel of FIG. 4. The pre-crimping assembly has several of the same components previously described of the pre-crimping assembly 160, namely the support plate 162 which supports a handle 164 about an eccentric bushing 166, and a latch 168 pinned to the handle 164, the latch having a locking gear 178. Furthermore a latch plate 194 supports the latch 168 in a desired position. The handle 164 supports a crimping roller assembly 196, which is shown in exploded detail in FIG. 38.

Figure 38:
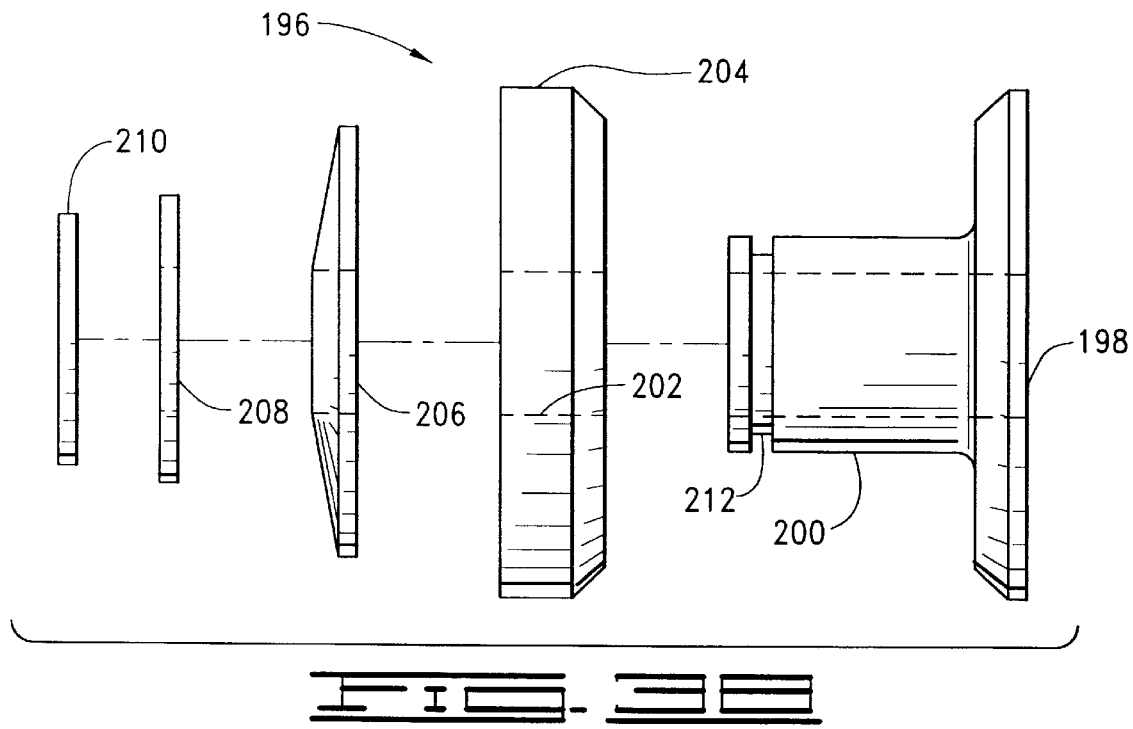
FIG. 38 is an exploded view of the crimping roller assembly of the pre-crimping assembly of FIG. 37.

FIG. 38 shows a bottom roller 198 has a shaft portion 200 which engages a bore 202 of a top roller 204. One or more spring washers 206, such as a Belleville type, and a flat washer 208 are stacked on the shaft 200 and against the top roller 204. If more than one spring washer is used they may be stacked parallel or opposite to each other to achieve the desire position and spring compression. A circle clip 210 engages a groove 212 in the shaft 200 to retain the components of the crimping roller assembly 196.

In use, the crimping roller assembly 196 is similarly set up as the pre-crimping assembly 160 discussed previously. By lifting the latch 168 the handle 164 can be lowered to bring the crimping roller assembly 196 into operable engagement with the standing seam 25. The eccentric bushing 166 is rotated to align the roller flanges with the seam. The latch plate is adjusted to place the roller assembly 196 to the proper depth of engagement with the seam 25.

FIGS. 45–46

Figure 39:
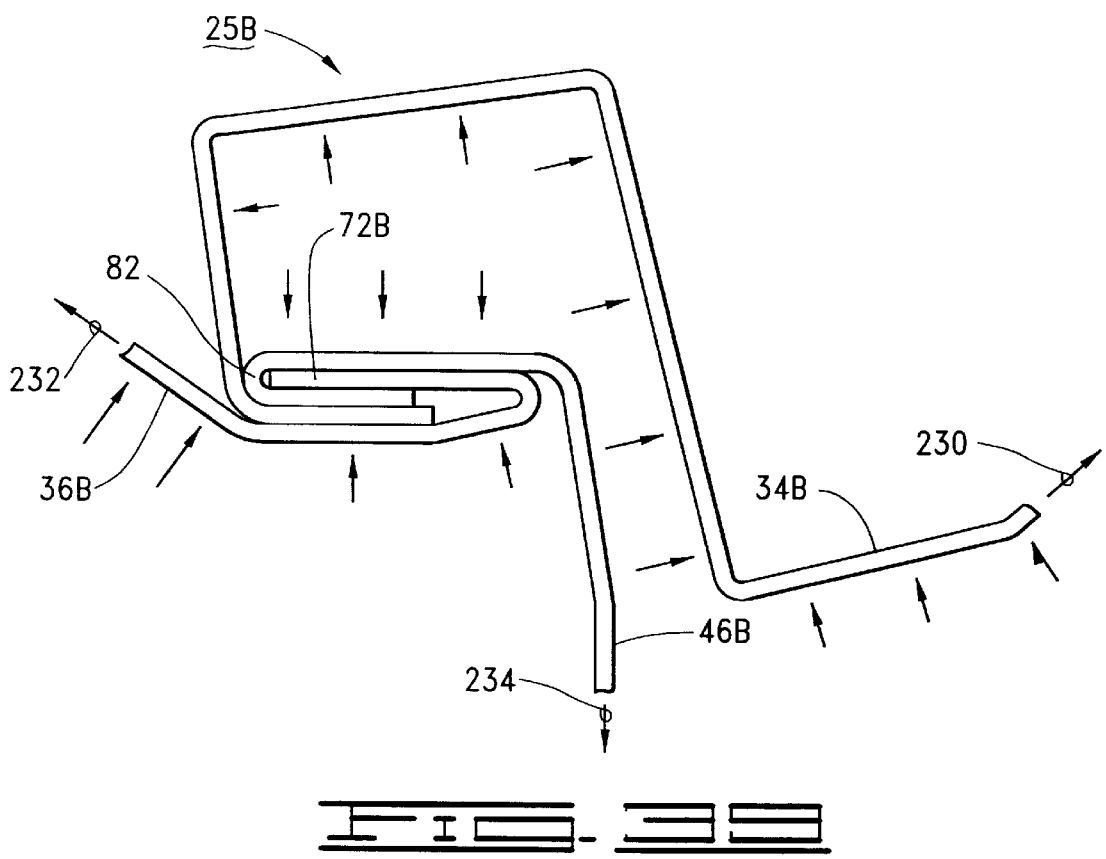
FIG. 39 is a diagrammatical representation showing one seamed configuration of adjacent roof panels of the present invention resisting unfurling when subjected to uplift loading.

FIG. 39 shows the manner in which the seamed configuration of adjacent roof panels of a roof of the present invention resist unfurling or unzipping when subjected to uplift loading. It will be noted from FIG. 39 that uplift forces tend to lift and rotate the roof panels. This lifting and rotating force on the female sidelap portion 34 is along the directional arrow 230. This lifting and rotating force on the male sidelap portion 36 is along the directional arrow 232. A downward force in the direction of arrow 234 is exerted by the roof clip 46 resulting in the attachment thereof to the underlying roof structure.

Figure 40:
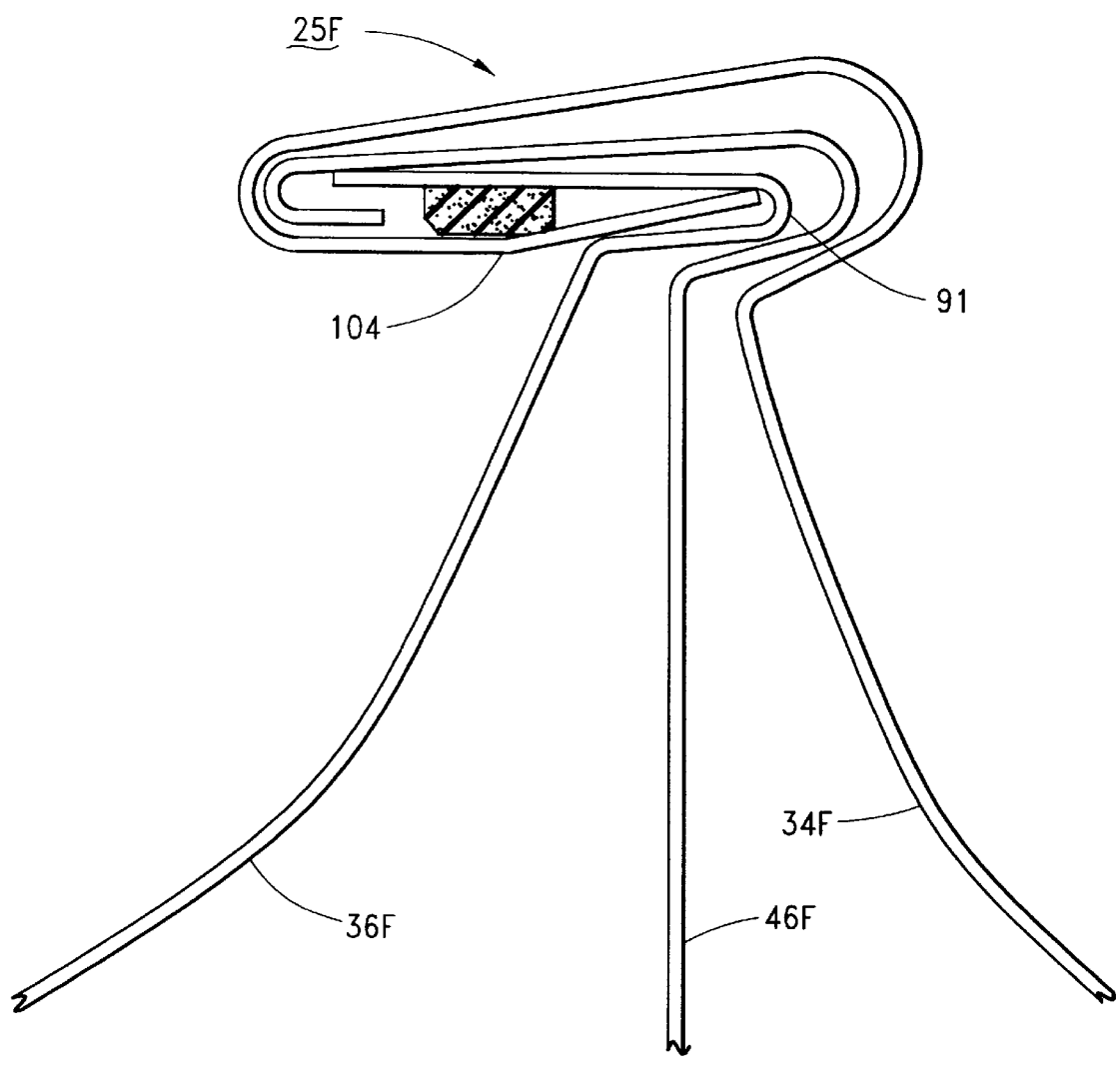
FIG. 40 is a diagrammatical representation showing one other seamed configuration of adjacent roof panels of the present invention resisting unfurling when subjected to uplift loading.

The amount of deflection illustrated by the uplift forces of FIG. 39 is dramatic, and certainly beyond the elastic limit of the panels. Even so, the standing seam integrity is maintained so that the adjacent panels do not unfurl or unzip. It will be noted that the radiused portion 82 of the roof clip 46B is lockingly engaged with the tang member 72B so that the forces 234 and 232 will not separate the roof clip 46B from the male sidelap portion 36B. It will be further noted that the female sidelap portion 36B is lockingly engaged with the female sidelap portion 34B so that the forces 230 and 232 will not separate the sidelap portions. In a similar manner it will be noted from FIG. 40 that the uplift forces that tend to lift and separate the male sidelap portion 36F and the female sidelap portion 34F produce forces, herein sometimes referred to as seaming forces, in the opposite direction on the tang member 104 and the retaining groove 91, so as to drive the tang member 104 ever more into the retaining groove 91. In this manner, the uplift forces do not tend to unfurl or unzip the standing seam because such uplift forces are resisted by the seaming forces.

It is clear that the present invention is well adapted to carry out the objects and to attain the ends and advantages mentioned as well as those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. A standing seam roof assembly in which adjacent roof panels are supported by underlying support structure in overlapping edge relationship to form a standing seam assembly that is resistant to unfurling when subjected to uplift forces, the standing seam roof assembly comprising:
   a first roof panel having a female sidelap portion comprising a first female cavity, a second female cavity and a retaining groove; and
   a second roof panel having male sidelap portions lockingly disposed in the first and second female cavities, the male sidelap portion comprising a locking tang member lockingly disposed in the retaining groove; and whereas the male sidelap portions are urged toward the female sidelap portion in the first and second female cavities in locking retention therebetween and the locking tang member is urged toward the retaining groove in locking retention therebetween by the seaming forces which thereby resist unfurling of the panels under the forces of wind uplift.

2. A standing seam roof assembly in which adjacent roof panels are supported by underlying support structure in overlapping edge relationship to form a standing seam assembly that is resistant to unfurling when subjected to uplift forces, the standing seam roof assembly comprising:

a first panel having a female sidelap portion which forms a first male insertion cavity and a second male insertion cavity;

a second panel having a male sidelap portion lockingly disposed in the first male insertion cavity and in the second male insertion cavity;

a retaining groove supported by the female sidelap portion of the first panel; and a locking tang member supported by the male sidelap portion of the second panel and lockingly engaged in the retaining groove.

3. The standing seam roof assembly of claim 2 wherein the female sidelap portion further comprises a surface to which mastic material is attached.

4. The standing seam roof assembly of claim 2, wherein the standing seam assembly is formed by inserting the male sidelap portion means into the male insertion cavity, and forming the standing seam assembly through deformation of the male and female sidelap portion means, whereby the male sidelap portion is urged toward the female sidelap portion in the first and second female cavities in locking retention therebetween and the locking tang member is lockingly engaged within the retaining groove member to oppose uplift forces which tend to separate the male sidelap portion from the female sidelap portion.

5. The standing seam roof assembly of claim 4 further comprising clip means for securing the male sidelap portion of the second roof panel to the underlying support structure.

6. A standing seam roof assembly in which adjacent roof panels are supported by underlying support structure in overlapping edge relationship to form a standing seam between adjacent roof panels, the standing seam roof assembly comprising:

a first roof panel having female sidelap portion means for forming a male insertion cavity, the female sidelap portion means comprising:
a first leg portion extending from the first roof panel;
a first radiused portion extending from the first leg portion;
a second leg portion extending from the first radiused portion;
a second radiused portion extending from the second leg portion; and
a third leg portion extending from the second radiused portion in a direction towards the first leg portion, a distal end of the third leg portion forming a retaining groove;

a second roof panel having male sidelap portion means for forming a standing seam assembly, the male sidelap portion means comprising:
a fourth leg portion extending from the second roof panel;
a third radiused portion extending from the fourth leg portion;
a fifth leg portion extending from the third radiused portion;
a fourth radiused portion extending from the fifth leg portion; and
a sixth leg portion extending from the fourth radiused portion in a direction towards the fourth leg portion, a distal end of the sixth leg portion receivingly disposed in the retaining groove; and wherein the male sidelap portion means is inserted into the male insertion cavity to form a standing seam joining the first and second roof panels, the standing seam characterized as forming force couples that resist forces due to uplift of the first and second roof panels so that unfurling of the standing seam is prevented.

7. The standing seam roof assembly of claim 6 wherein mastic is placed between the male and female sidelap portions.

8. The standing seam roof assembly of claim 6 further comprises a clip having a clip tab configured to the male sidelap portion.

9. A standing seam roof assembly in which adjacent roof panels are supported by underlying support structure in overlapping edge relationship to form a standing seam assembly that is resistant to unfurling when subjected to uplift forces, the standing seam roof assembly comprising:

a first panel having a female sidelap portion which forms a first male insertion cavity, a second male insertion cavity and a retaining groove; and a second panel having male sidelap portions lockingly disposed in the first male insertion cavity and in the second male insertion cavity, the male sidelap portion forming a locking tang member lockingly engaged in said retaining groove.

10. The standing seam roof assembly of claim 9 wherein the female sidelap portion further comprises a surface to which mastic material is attached.

11. The standing seam roof assembly of claim 9 wherein the mastic is secured between the male and female lap portions.

12. The standing seam roof assembly of claim 9 wherein the standing seam assembly is formed by inserting the male sidelap portion means into the male insertion cavity, and forming the standing seam assembly through deformation of the male and female sidelap portion means, whereby the male sidelap portion is urged toward the female sidelap portion in the first and second female cavities in locking retention therebetween and the locking tang member is lockingly engaged within the retaining groove member to form a water tight joint when the panels are subjected to uplift forces which tend to separate the male sidelap portion from the female sidelap portion.

13. The standing seam roof assembly of claim 12 further comprising clip means for securing the male sidelap portion of the second roof panel to the underlying support structure.

14. The standing seam roof assembly of claim 12 wherein the clip tab is configured substantially to conform to the same configuration as the male in the seaming operation.

15. A standing seam roof assembly in which adjacent roof panels are supported by underlying support structure in overlapping edge relationship to form a standing seam assembly that is resistant to sidelap seam leaks when subjected to uplift forces, the standing seam roof assembly comprising:

a first panel having a female sidelap portion which forms male insertion cavities;

a second panel having male sidelap portion receivingly disposed in the male insertion cavities and having a retaining groove; and a locking tang member supported by the male sidelap portion and lockingly engaged in the retaining groove.

16. The standing roof assembly of claim 15 wherein the female sidelap portion further comprises a surface to which mastic material is attached to form a sealant dam preventing water from penetration.

17. The standing seam roof assembly of claim 16 wherein the standing seam assembly is formed by inserting the male sidelap portion into the male insertion cavities and forming the standing seam assembly though deformation of the male and female sidelap portion, whereby the locking tang member is lockingly engaged within the retaining groove to oppose to water penetration.

18. The standing seam roof assembly of claim 17 further comprising a clip securing the male sidelap portion of the second roof panel to the underlying support structure.

19. A standing seam roof assembly in which adjacent roof panels are supported by underlying support structure in overlapping edge relationship to form a standing seam between adjacent roof panels, the standing seam roof assembly comprising:

a first roof panel having a female sidelap portion forming male insertion cavities, the female sidelap portion having a first leg portion extending from the first roof panel, a first radiused portion extending from the first leg portion, a second leg portion extending from the first radiused portion, a second radiused portion extending from the second leg portion, and a third leg portion extending from the second radiused portion in a direction towards the first leg portion, a distal end of the third leg portion forming a retaining groove; and a second roof panel having a male sidelap portion having a fourth leg portion extending from the second roof panel, a third radiused portion extending from the fourth leg portion; a fifth leg portion extending from the third radiused portion, a fourth radiused portion extending from the fifth leg portion, and a sixth leg portion extending from the fourth radiused portion towards the fourth leg portion forming a tang member lockingly disposed in the retaining groove; and wherein the male sidelap portion is inserted into the male insertion cavities to form a standing seam joining the first and second roof panels, the standing seam forming a water tight dam to prevent water penetration.

* * * * *